US012558865B2

(12) United States Patent
Kim et al.

(10) Patent No.: US 12,558,865 B2
(45) Date of Patent: Feb. 24, 2026

(54) WINDOW AND ELECTRONIC DEVICE INCLUDING THE SAME

(71) Applicant: Samsung Display Co., Ltd., Yongin-si (KR)

(72) Inventors: Min-Sung Kim, Hwaseong-si (KR); Doyoub Kim, Suwon-si (KR); Seung-Ho Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/885,884

(22) Filed: Aug. 11, 2022

(65) Prior Publication Data

US 2023/0150226 A1 May 18, 2023

(30) Foreign Application Priority Data

Nov. 15, 2021 (KR) ........................ 10-2021-0156816

(51) Int. Cl.
B32B 3/30 (2006.01)
B32B 17/06 (2006.01)
(Continued)

(52) U.S. Cl.
CPC ............... B32B 3/30 (2013.01); B32B 17/06 (2013.01); B32B 27/06 (2013.01); B32B 7/12 (2013.01);
(Continued)

(58) Field of Classification Search
CPC .......... B32B 3/30; B32B 17/06; B32B 27/06; B32B 7/12; B32B 15/04; B32B 15/18;

B32B 15/20; B32B 2307/418; B32B 2457/20; Y10T 428/24479; Y10T 428/24942; Y10T 428/2495; G02B 1/14; H04M 1/0268; G06F 1/1641; G06F 1/1652; G06F 1/1637; G09F 9/301; C03C 15/00

(Continued)

(56) References Cited

U.S. PATENT DOCUMENTS

2017/0064845 A1* 3/2017 Jung ...................... H05K 1/028
2018/0248140 A1* 8/2018 Sano ...................... H10K 71/00
(Continued)

FOREIGN PATENT DOCUMENTS

CN 210091604 U * 2/2020 .......... G06F 1/1641
CN 112991960 A * 6/2021 ............. G09F 9/301
(Continued)

*Primary Examiner* — Megha M Gaitonde
(74) *Attorney, Agent, or Firm* — CANTOR COLBURN LLP

(57) ABSTRACT

A window, which is a cover window for an electronic device and has an upper surface and a lower surface opposite to each other in a thickness direction, includes a non-folding portion including a first non-folding portion, a second non-folding portion, and a third non-folding portion spaced apart from one another, a first folding portion disposed between the first non-folding portion and the second non-folding portion and foldable to have a first radius of curvature, and a second folding portion disposed between the second non-folding portion and the third non-folding portion and foldable to have a second radius of curvature greater than the first radius of curvature, and the first folding portion is thinner than the second folding portion.

12 Claims, 16 Drawing Sheets

(51) Int. Cl.
  *B32B 27/06*       (2006.01)
  *B32B 7/12*       (2006.01)
  *B32B 15/04*       (2006.01)
  *B32B 15/18*       (2006.01)
  *B32B 15/20*       (2006.01)

(52) U.S. Cl.
  CPC .............. *B32B 15/04* (2013.01); *B32B 15/18*
    (2013.01); *B32B 15/20* (2013.01); *B32B*
    *2307/418* (2013.01); *B32B 2457/20* (2013.01);
    *Y10T 428/24479* (2015.01)

(58) Field of Classification Search
  USPC ................................. 428/156, 172, 212, 213
  See application file for complete search history.

(56)          References Cited

U.S. PATENT DOCUMENTS

| | | | |
|---|---|---|---|
| 2020/0064886 A1 | 2/2020 | Cho et al. | |
| 2020/0292731 A1 | 9/2020 | Park et al. | |
| 2021/0064088 A1* | 3/2021 | Kim .................... | H04M 1/0216 |
| 2021/0109570 A1 | 4/2021 | Wu et al. | |
| 2021/0118337 A1 | 4/2021 | Park et al. | |
| 2022/0006038 A1* | 1/2022 | Park .................... | H10K 59/873 |

FOREIGN PATENT DOCUMENTS

| | | | |
|---|---|---|---|
| EP | 3136158 A1 | 3/2017 | |
| EP | 3790263 A1 | 3/2021 | |
| KR | 1020170122554 A | 11/2017 | |
| KR | 1020210016983 A | 2/2021 | |
| KR | 1020210047616 A | 4/2021 | |

* cited by examiner

WINDOW AND ELECTRONIC DEVICE INCLUDING THE SAME

This application claims priority to Korean Patent Application No. 10-2021-0156816, filed on Nov. 15, 2021, and all the benefits accruing therefrom under 35 U.S.C. § 119, the content of which in its entirety is herein incorporated by reference.

BACKGROUND

1. Field

Embodiments of the disclosure described herein relate to a window and an electronic device including the window, and more particularly, relate to a foldable window and an electronic device including the foldable window.

2. Description of the Related Art

Various types of electronic devices are being used to provide image information, and display devices including a flexible display panel that can be folded or bent are being developed. Unlike a rigid display device, a flexible display device may be diversely changed in shape by folding, rolling, or bending and may be carried regardless of the size of a display screen.

SUMMARY

A flexible display device typically includes a window for protecting a display panel while not hindering a folding or bending motion. Accordingly, a window having high folding characteristics without degradation in mechanical properties is desired to be developed.

Embodiments of the disclosure provide a window including a plurality of folding portions and having high folding characteristics and improved impact resistance.

Embodiments of the disclosure provide an electronic device including a window including a plurality of folding portions and having high folding characteristics and improved resistance to an external impact.

According to an embodiment, a window, which is a cover window for an electronic device and has an upper surface and a lower surface opposite to each other in a thickness direction, includes a non-folding portion including a first non-folding portion, a second non-folding portion, and a third non-folding portion spaced apart from one another, a first folding portion disposed between the first non-folding portion and the second non-folding portion and foldable to have a first radius of curvature, and a second folding portion disposed between the second non-folding portion and the third non-folding portion and foldable to have a second radius of curvature greater than the first radius of curvature, where the first folding portion is thinner than the second folding portion.

In an embodiment, the first folding portion may be foldable in a way such that the upper surface of the first non-folding portion and the upper surface of the second non-folding portion are adjacent to each other and face each other, and the second folding portion may be foldable in a way such that the upper surface of the third non-folding portion is exposed to the outside.

In an embodiment, the first folding portion may be foldable in a way such that the upper surface of the first non-folding portion and the upper surface of the second non-folding portion are adjacent to each other and face each other, and the second folding portion may be foldable in a way such that the lower surface of the third non-folding portion is exposed to the outside.

In an embodiment, a first recess may be defined on the first folding portion, and a second recess may be defined on the second folding portion.

In an embodiment, the first recess and the second recess may be defined on the upper surface, or the first recess and the second recess may be defined on the lower surface.

In an embodiment, one of the first recess and the second recess may be defined on the upper surface, and the other of the first recess and the second recess may be defined on the lower surface.

In an embodiment, each of the first folding portion and the second folding portion may have a thickness of 2R/100 or less, where R denotes the first radius of curvature or the second radius of curvature.

In an embodiment, the second non-folding portion may have a thickness increasing as being from the first non-folding portion toward the third non-folding portion.

In an embodiment, the first non-folding portion may have a first thickness, and the third non-folding portion may have a third thickness greater than the first thickness.

In an embodiment, the first folding portion may have a thickness increasing as being farther away from the second folding portion.

In an embodiment, the first non-folding portion and the second non-folding portion may have symmetrical shapes with respect to the first folding portion.

In an embodiment, the non-folding portion may have a thickness of about 100 micrometers (μm) or greater, the first folding portion may have a thickness in a range of about 30 μm to about 60 μm, and the second folding portion may have a thickness in a range of about 60 μm to about 100 μm.

According to an embodiment, an electronic device includes a window having an upper surface and a lower surface opposite to each other in a thickness direction, and a display module disposed under the window, where the window includes a first non-folding portion, a second non-folding portion, a first folding portion disposed between the first non-folding portion and the second non-folding portion and foldable to have a first radius of curvature, a third non-folding portion, and a second folding portion disposed between the second non-folding portion and the third non-folding portion and foldable to have a second radius of curvature greater than the first radius of curvature, and the display module includes a first non-folding display portion corresponding to the first non-folding portion, a second non-folding display portion corresponding to the second non-folding portion, a first folding display portion corresponding to the first folding portion, a third non-folding display portion corresponding to the third non-folding portion, and a second folding display portion corresponding to the second folding portion. In such an embodiment, the first folding portion is thinner than the second folding portion.

In an embodiment, the first folding portion and the first folding display portion may be foldable in a way such that the upper surface of the first non-folding portion and the upper surface of the second non-folding portion face each other, and the second folding portion and the second folding display portion may be foldable in a way such that the upper surface of the third non-folding portion is exposed to the outside.

In an embodiment, the first folding portion and the first folding display portion may be foldable in a way such that the upper surface of the first non-folding portion and the upper surface of the second non-folding portion face each other, and the second folding portion and the second folding display portion may be foldable in a way such that the upper surface of the third non-folding portion and the lower surface of the first non-folding portion face each other.

In an embodiment, a gap between the upper surface of the first non-folding portion and the upper surface of the second non-folding portion may be smaller than twice the first radius of curvature when the first folding portion is folded in a way such that the upper surface of the first non-folding portion and the upper surface of the second non-folding portion are adjacent to each other and face each other.

In an embodiment, a gap between the upper surface of the first non-folding portion and the upper surface of the second non-folding portion may be about twice the first radius of curvature when the first folding portion is folded in a way such that the upper surface of the first non-folding portion and the upper surface of the second non-folding portion are adjacent to each other and face each other.

In an embodiment, a recess may be defined on the upper surface or the lower surface to correspond to each of the first folding portion and the second folding portion.

In an embodiment, the recess may be filled with a filling material having a same refractive index as the window.

In an embodiment, the first non-folding portion may have a first thickness, and the third non-folding portion may have a third thickness greater than the first thickness. In such an embodiment, the second non-folding portion may have a second thickness increasing as being from the first non-folding portion toward the third non-folding portion.

In an embodiment, a first thickness of the first non-folding portion may be increased as being farther away from the first folding portion, and a second thickness of the second non-folding portion may be increased from the first non-folding portion toward the third non-folding portion. In such an embodiment, the first non-folding portion and the second non-folding portion may be symmetrical to each other with respect to the first folding portion.

According to an embodiment, an electronic device includes a display module and a window disposed on the display module. In such an embodiment, the electronic device is divided into a first non-folding area, a first folding area foldable about a first folding axis in an in-folding manner, a second non-folding area, a second folding area foldable about a second folding axis spaced apart from the first folding axis in an in-folding or out-folding manner, and a third non-folding area. In such an embodiment, the window includes a first non-folding portion corresponding to the first non-folding area, a first folding portion corresponding to the first folding area, a second non-folding portion corresponding to the second non-folding area, a second folding portion corresponding to the second folding area, and a third non-folding portion corresponding to the third non-folding area, and the first non-folding portion, the first folding portion, the second non-folding portion, the second folding portion, and the third non-folding portion are arranged in one direction. In such an embodiment, the first folding portion is foldable to have a first radius of curvature, and the second folding portion is foldable to have a second radius of curvature greater than the first radius of curvature. In such an embodiment, the second folding portion is thicker than the first folding portion.

In an embodiment, the window may include an upper surface and a lower surface opposite to each other in a thickness direction, and a recess may be defined on one of the upper surface and the lower surface of the first folding portion and one of the upper surface and the lower surface of the second folding portion.

In an embodiment, the first non-folding portion may have a first thickness, and the third non-folding portion may have a third thickness greater than the first thickness. In such an embodiment, the second non-folding portion may have a second thickness increasing as being from the first non-folding portion toward the third non-folding portion.

In an embodiment, a first thickness of the first non-folding portion may be increasing as being farther away from the first folding portion, and a second thickness of the second non-folding portion may be increasing as being from the first non-folding portion toward the third non-folding portion. In such an embodiment, the first non-folding portion and the second non-folding portion may be symmetrical to each other with respect to the first folding portion.

BRIEF DESCRIPTION OF THE DRAWINGS

The above and other features of the disclosure will become apparent by describing in detail embodiments thereof with reference to the accompanying drawings, in which:

FIG. 7A is a cross-sectional view of a window according to an embodiment;

FIG. 7B is a cross-sectional view of a window according to an embodiment;

DETAILED DESCRIPTION

Figure 1:
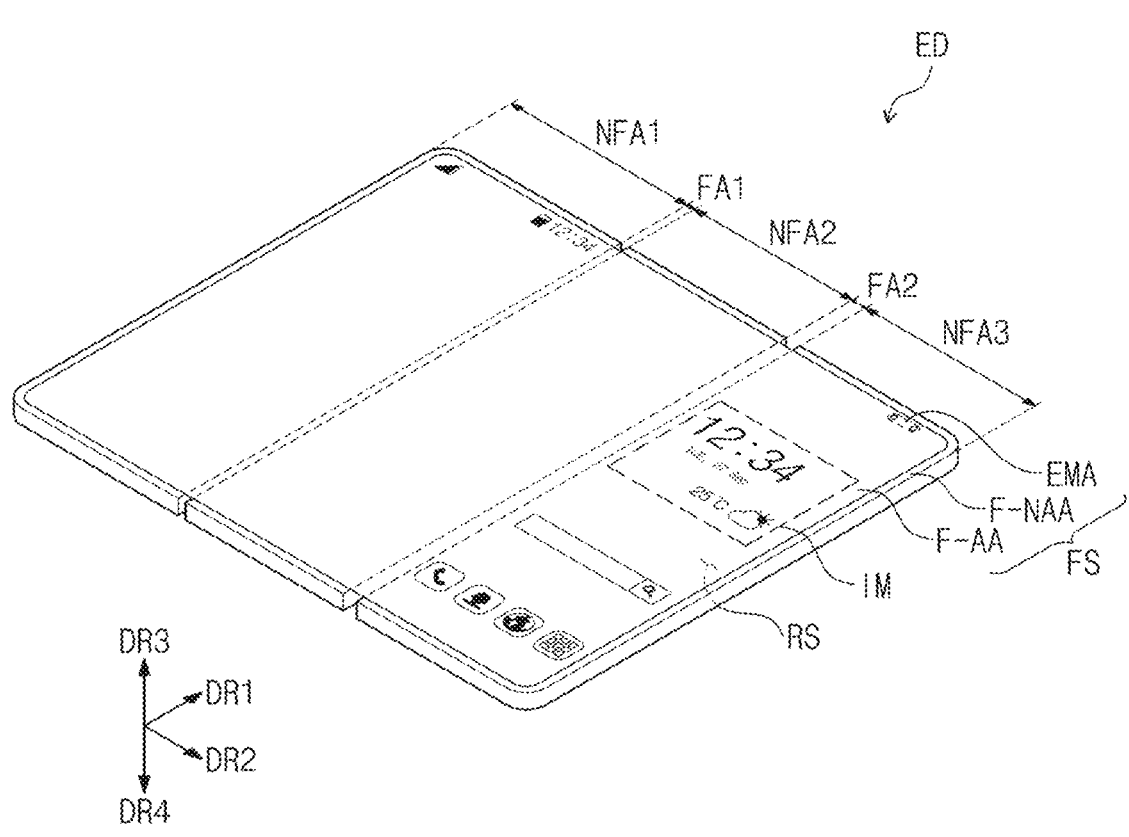
FIG. 1 is a perspective view illustrating an electronic device in an unfolded state according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In this specification, when it is mentioned that a component (or, an area, a layer, a part, etc.) is referred to as being "on", "connected to" or "coupled to" another component, this means that the component may be directly on, connected to, or coupled to the other component or a third component may be therebetween.

The expression "directly disposed" used herein may mean that there is no additional layer, film, area, or plate between one portion, such as a layer, a film, an area, or a plate, and another portion. For example, the expression "directly disposed" may mean that two layers or two members are disposed without an additional member such as an adhesive member therebetween.

Like reference numerals refer to like elements throughout. Additionally, in the drawings, the thicknesses, proportions, and dimensions of components are exaggerated for effective description.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Terms such as first, second, and the like may be used to describe various components, but the components should not be limited by the terms. The terms may be used only for distinguishing one component from other components. For example, without departing the scope of the disclosure, a first component may be referred to as a second component, and similarly, the second component may also be referred to as the first component. The terms of a singular form may include plural forms unless otherwise specified.

In addition, terms such as "below", "under", "above", and "over" are used to describe a relationship of components illustrated in the drawings. The terms are relative concepts and are described based on directions illustrated in the drawing. The expression "disposed on" used herein may mean that it is disposed not only on an upper portion but also a lower portion of any one member.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms used herein, including technical or scientific terms, have the same meanings as those generally understood by those skilled in the art to which the disclosure pertains. Such terms as those defined in a generally used dictionary are to be interpreted as having meanings equal to the contextual meanings in the relevant field of art, and are not to be interpreted as having ideal or excessively formal meanings unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a window re and an electronic device including the window according to the disclosure will be described in detail with reference to the accompanying drawings.

Figure 2A:
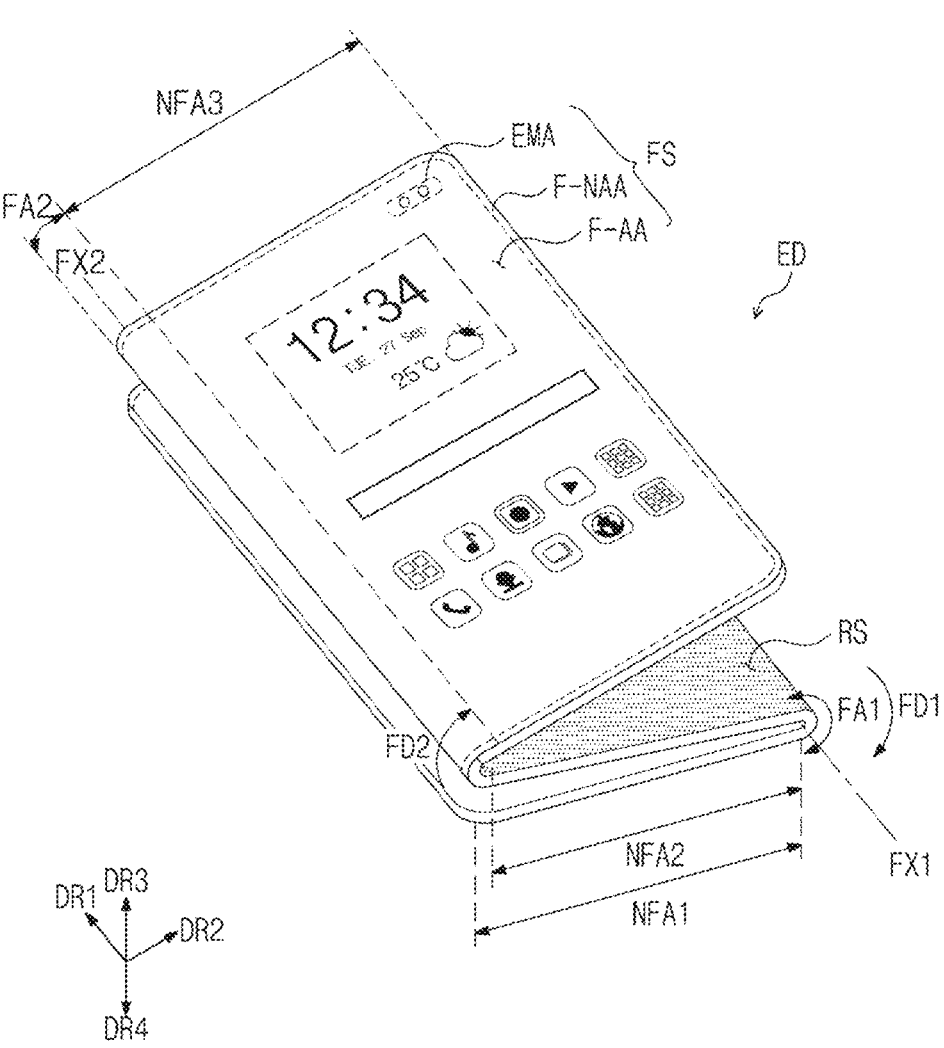
FIG. 2A is a perspective view illustrating the electronic device in a process of folding according to an embodiment.
Figure 2B:
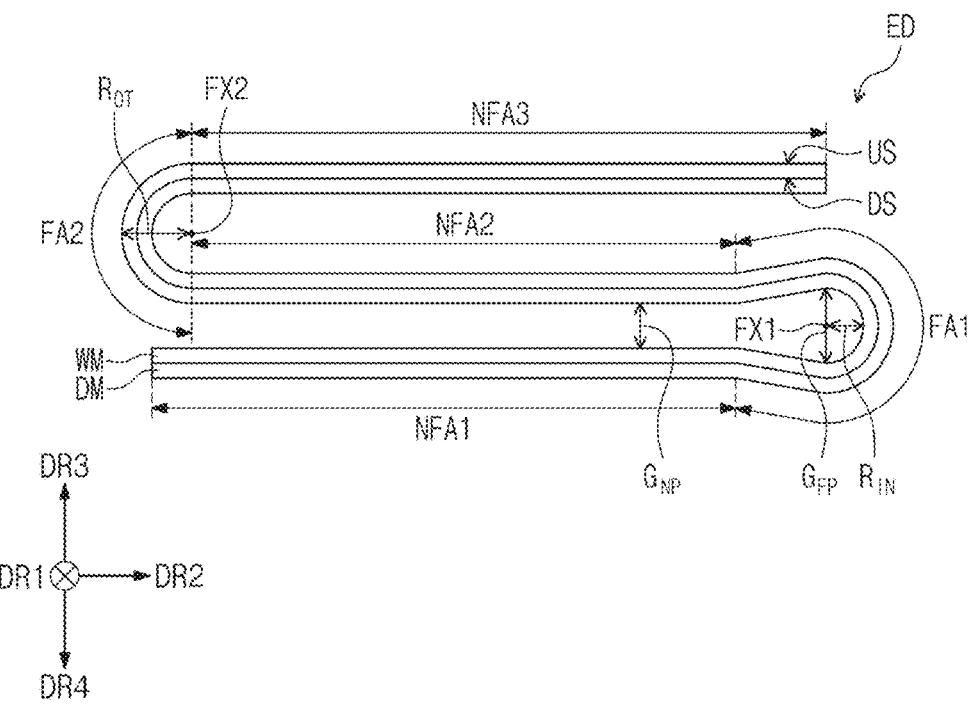
FIG. 2B is a cross-sectional view illustrating the electronic device in a folded state according to an embodiment.
Figure 2C:
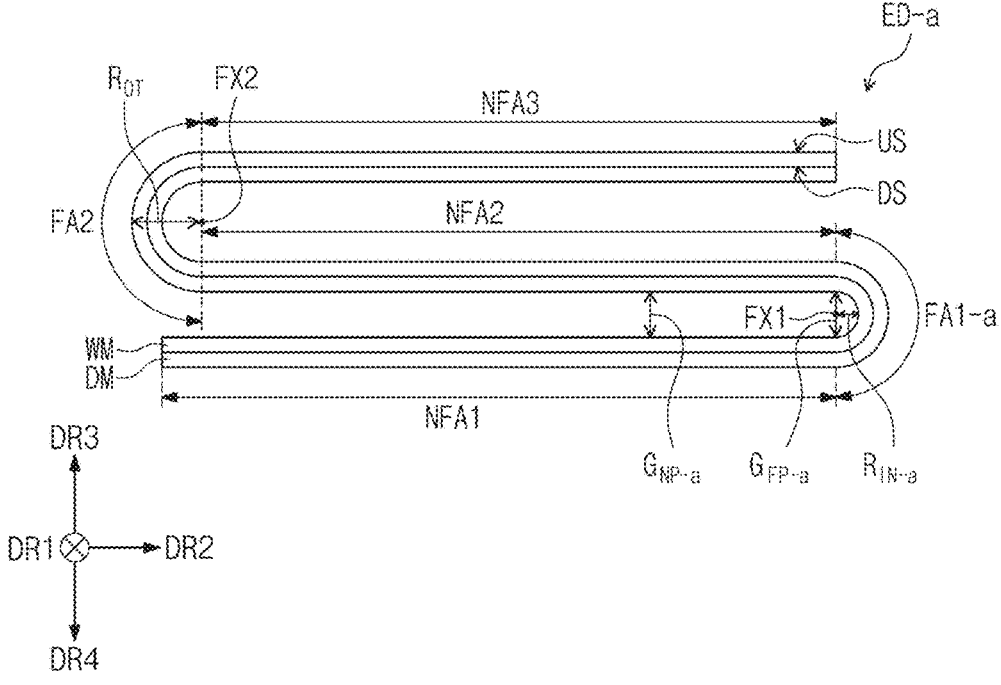
FIG. 2C is a cross-sectional view illustrating an electronic device in a folded state according to an embodiment.

FIG. 1 is a perspective view illustrating an electronic device ED in an unfolded state according to an embodiment. FIG. 2A is a perspective view illustrating the electronic device ED in a process of folding according to an embodiment. FIG. 2B is a cross-sectional view illustrating the electronic device ED in a folded state according to an embodiment. FIG. 2C is a cross-sectional view illustrating an electronic device ED-a in a folded state according to an embodiment.

An embodiment of the electronic device ED may be a device activated depending on an electrical signal. In an embodiment, for example, the electronic device ED may be a mobile phone, a tablet computer, a car navigation system, a game machine, or a wearable device. However, embodiments of the disclosure are not limited thereto. Hereinafter, for convenience of description, embodiments where the electronic device ED is a mobile phone will be described, but not being limited thereto.

Although first to fourth directional axes DR1 to DR4 are illustrated in FIG. 1 and the following drawings, the directions indicated by the first to fourth directional axes DR1 to DR4 described in this specification are relative concepts and may be changed to different directions. Furthermore, the directions indicated by the first to fourth directional axes DR1 to DR4 may be referred to as the first to fourth directions, and identical reference numerals may be used to refer to the directions indicated thereby.

Referring to FIG. 1, an embodiment of the electronic device ED may include a display surface FS parallel to a plane defined by the first directional axis DR1 and the second directional axis DR2 crossing the first directional axis DR1 in the unfolded state. The electronic device ED may provide an image IM to a user through the display surface FS. The electronic device ED may display the image IM in the direction of the third directional axis DR3 on the display surface FS parallel to the first directional axis DR1 and the second directional axis DR2. In this specification, front surfaces (or, upper surfaces) and rear surfaces (or, lower surfaces) of components are defined with respect to the direction in which the image IM is displayed. In this specification, the direction in which the image IM is displayed may be defined as the direction of the third directional axis DR3, and the direction of the fourth directional axis DR4 may be defined as the direction opposite to the direction of the third directional axis DR3.

In such an embodiment, the electronic device ED may sense an external input applied from the outside. The external input may include various forms of inputs provided from outside the electronic device ED. In an embodiment, for example, the external input may include not only a touch of a part of the user's body (e.g., the user's hand) on the electronic device ED but also an external input (e.g., hovering) applied by an input tool or a part of the user's body that is proximate to, or spaced a predetermined distance apart from, the electronic device ED. In an embodiment, the external input may have various forms such as force, pressure, temperature, light, and the like.

The display surface FS of the electronic device ED may include an active area F-AA and a peripheral area F-NAA. The active area F-AA may be an area activated depending on an electrical signal. The electronic device ED may display the image IM through the active area F-AA. Furthermore, the active area F-AA may sense various forms of external inputs. The peripheral area F-NAA is adjacent to the active area F-AA. The peripheral area F-NAA may have a predetermined color.

An electronic module area EMA may be included in the active area F-AA. Various electronic modules may be disposed in the electronic module area EMA. In an embodiment, for example, the electronic modules may include at least one selected from a camera, a speaker, a light detection sensor, and a heat detection sensor. The electronic module area EMA may sense an external object received through the display surface FS, or may provide a sound signal, such as a voice, to the outside through the display surface FS. The electronic modules may include a plurality of components and are not limited to any one embodiment.

The electronic module area EMA may be surrounded by the active area F-AA and the peripheral area F-NAA. However, without being limited thereto, the electronic module area EMA may be disposed in the active area F-AA and is not limited to any one embodiment. When the electronic modules disposed in the electronic module area EMA are deactivated, the electronic module area EMA may display a video or an image on the display surface.

A rear surface RS of the electronic device ED may be a surface facing the display surface FS. In an embodiment, the rear surface RS may be an outside surface of the electronic device ED, and a video or an image may not be displayed on the rear surface RS. However, without being limited thereto, the rear surface RS may function as a second surface on which a video or an image is displayed. The electronic device ED may further include an electronic module area EMA-B (FIG. 3A) disposed on the rear surface RS. A camera, a speaker, a light detection sensor, or the like may be disposed in the electronic module area EMA-B disposed on the rear surface RS.

In an embodiment of the electronic device ED, the peripheral area F-NAA may surround the active area F-AA. Accordingly, the shape of the active area F-AA may be substantially defined by the peripheral area F-NAA, but not being limited thereto. Alternatively, the peripheral area F-NAA may be disposed adjacent to only one side of the active area F-AA, or may be omitted. The electronic device ED may include various forms of active areas and is not limited to any one embodiment.

The electronic device ED may include folding areas FA1 and FA2 and non-folding areas NFA1, NFA2, and NFA3. The electronic device ED may include the first non-folding area NFA1, the first folding area FA1, the second non-folding area NFA2, the second folding area FA2, and the third non-folding area NFA3 arranged side by side in one direction. The first non-folding area NFA1 and the second non-folding area NFA2 may be spaced apart from each other with the first folding area FA1 therebetween, and the second non-folding area NFA2 and the third non-folding area NFA3 may be spaced apart from each other with the second folding area FA2 therebetween. However, the numbers of folding areas and non-folding areas are not limited to those illustrated, and alternatively, the electronic device ED may include three or more folding areas and four or more non-folding areas.

FIG. 2A is a perspective view illustrating the electronic device ED in a process of folding according to an embodiment. FIG. 2B is a cross-sectional view illustrating the electronic device ED in a folded state according to an embodiment. FIG. 2C is a cross-sectional view illustrating the electronic device ED-a in a folded state according to an embodiment.

Referring to FIGS. 2A and 2B, an embodiment of the electronic device ED may include the first folding area FA1 foldable about a first folding axis FX1 parallel to the first directional axis DR1 and the second folding area FA2 foldable about a second folding axis FX2 that is parallel to the first directional axis DR1 and spaced apart from the first folding axis FX1. The second folding axis FX2 may be spaced apart from the first folding axis FX1 in the direction of the second directional axis DR2. Alternatively, without being limited thereto, the first folding axis FX1 and the second folding axis FX2 may be parallel to any direction other than the first directional axis DR1.

In an embodiment of the electronic device ED, the first folding area FA1 may be folded in a first folding direction FD1, and the second folding area FA2 may be folded in a second folding direction FD2. In an embodiment, the first folding direction FD1 may be a direction in which the first folding area FA1 is folded in a way such that the display surface of the first non-folding area NFA1 and the display surface of the second non-folding area NFA2 are adjacent to each other and face each other, and the second folding direction FD2 may be a direction in which the second folding area FA2 is folded in a way such that the display surface of the third non-folding area NFA3 is exposed to the outside.

The electronic device ED may include a display module DM and a window WM. The window WM may be disposed on the display module DM. The window WM may form the display surface FS of the electronic device ED. The window WM may include a lower surface DS adjacent to the display module DM and an upper surface US facing the lower surface DS in the thickness direction.

In an embodiment, as illustrated in FIGS. 2A and 2B, the first folding axis FX1 may be an imaginary axis extending in the direction of the first directional axis DR1 and may be located over the display surface FS. In such an embodiment, the second folding axis FX2 may be an imaginary axis extending in the direction of the first directional axis DR1 and may be located under the rear surface RS.

In an embodiment of the electronic device ED, the first folding area FA1 may be folded in an in-folding manner such that the display surface of the first non-folding area NFA1 and the display surface of the second non-folding area NFA2 are adjacent to each other and face each other. The second folding area FA2 may be folded in an out-folding manner such that the rear surface of the second non-folding area NFA2 and the rear surface of the third non-folding area NFA3 are adjacent to each other and face each other. The display surface FS of the third non-folding area NFA3 may be exposed to the outside in a folded state of the electronic device ED, that is, when the electronic device ED is in the folded state. When the electronic device ED is folded as illustrated in FIG. 2A, the upper surface US of the window WM in the first non-folding area NFA1 and the upper surface US of the window WM in the second non-folding area NFA2 may be adjacent to each other and may face each other, and the upper surface US of the window WM in the third non-folding area NFA3 may be exposed to the outside.

Referring to FIG. 2B, the first folding area FA1 may be folded to have a first radius of curvature $R_{IN}$. The first radius of curvature $R_{IN}$ may correspond to the maximum distance from the first folding axis FX1 to the upper surface of the window WM of the first folding area FA1. The second folding area FA2 may be folded to have a second radius of curvature $R_{OT}$. The second radius of curvature $R_{OT}$ may correspond to the maximum distance from the second folding axis FX2 to the upper surface of the window WM of the second folding area FA2. In an embodiment, the second radius of curvature $R_{OT}$ of the second folding area FA2 folded in an out-folding manner may be greater than the first radius of curvature RN of the first folding area FA1 folded in an in-folding manner.

In an embodiment of the electronic device ED, as illustrated in FIG. 2B, the gap $G_{FP}$ between the upper surfaces facing each other in the first folding area FA1 folded in an in-folding manner may be greater than the gap $G_{NP}$ between the first non-folding area NFA1 and the second non-folding area NFA2 facing each other in the folded state. In such an embodiment of the electronic device ED, the gap $G_{FP}$ between the upper surfaces of the window WM facing each other in the first folding area FA1 may be gradually increased toward the first folding axis FX1 from portions adjacent to the first and second non-folding areas NFA1 and NFA2. The first folding area FA1 may have a water-drop shape when viewed on a plane defined by the second directional axis DR2 and the third directional axis DR3. The gap $G_{NP}$ between the upper surfaces of the window WM between the first non-folding area NFA1 and the second non-folding area NFA2 facing each other in the folded state may be smaller than twice the first radius of curvature $R_{IN}$.

The second folding area FA2 may have a U-shape when viewed on the plane defined by the second directional axis DR2 and the third directional axis DR3. In as embodiment illustrated in FIG. 2B, when the first folding area FA1 is folded, the first radius of curvature $R_{IN}$ may be about 2.5 millimeters (mm), and the second radius of curvature $R_{OT}$ may be about 4.0 mm. However, without being limited thereto, the first radius of curvature $R_{IN}$ and the second radius of curvature $R_{OT}$ may be changed or modified based on the thickness of the electronic device.

FIG. 2C is a cross-sectional view illustrating the electronic device ED-a in a folded state according to an embodiment. The embodiment of the electronic device ED-a illustrated in FIG. 2C is substantially the same as the embodiment of the electronic device ED illustrated in FIG. 2B except for a folded shape of a first folding area. In an embodiment of the electronic device ED-a shown in FIG. 2C, the first folding area FA1-a may be folded in an in-folding manner in a way such that a display surface of a first non-folding area NFA1 and a display surface of a second non-folding area NFA2 are adjacent to each other and face each other, and a second folding area FA2 may be folded in an out-folding manner in a way such that a rear surface of the second non-folding area NFA2 and a rear surface of a third non-folding area NFA3 are adjacent to each other and face each other.

Referring to FIG. 2C, the first folding area FA1-a may be folded to have a first radius of curvature $R_{IN-a}$. The first radius of curvature $R_{IN-a}$ may correspond to the maximum distance from a first folding axis FX1 to an upper surface of a window WM of the first folding area FA1-a. The second folding area FA2 may be folded to have a second radius of curvature $R_{OT}$. The second radius of curvature $R_{OT}$ may correspond to the maximum distance from a second folding axis FX2 to the upper surface of the window WM of the second folding area FA2. The second radius of curvature $R_{OT}$ of the second folding area FA2 folded in an out-folding manner may be greater than the first radius of curvature $R_{IN-a}$ of the first folding area FA1-a folded in an in-folding manner. Furthermore, the first radius of curvature $R_{IN-a}$ of the first folding area FA1-a in the embodiment illustrated in FIG. 2C may be smaller than the first radius of curvature RN of the first folding area FA1 in the embodiment illustrated in FIG. 2B.

In an embodiment of the electronic device ED-a illustrated in FIG. 2C, the gap $G_{FP-a}$ between the upper surfaces facing each other in the first folding area FA1-a folded in an in-folding manner may be identical to or substantially the same as the gap $G_{NP-a}$ between the first non-folding area NFA1 and the second non-folding area NFA2 facing each other in the folded state. The first folding area FA1-a may have a U-shape when viewed on the plane defined by the second directional axis DR2 and the third directional axis DR3. The gap $G_{NP-a}$ between the upper surfaces of the window WM between the first non-folding area NFA1 and the second non-folding area NFA2 facing each other in the folded state may correspond to or be about twice the first radius of curvature $R_{IN-a}$. In an embodiment illustrated in FIG. 2C, when the first folding area FA1-a is folded, the first radius of curvature $R_{IN-a}$ may be about 1.5 mm, and the second radius of curvature $R_{OT}$ may be about 4.0 mm. Alternatively, without being limited thereto, the first radius of curvature $R_{IN-a}$ and the second radius of curvature $R_{OT}$ may be changed or modified based on the thickness of the electronic device.

Figure 3A:
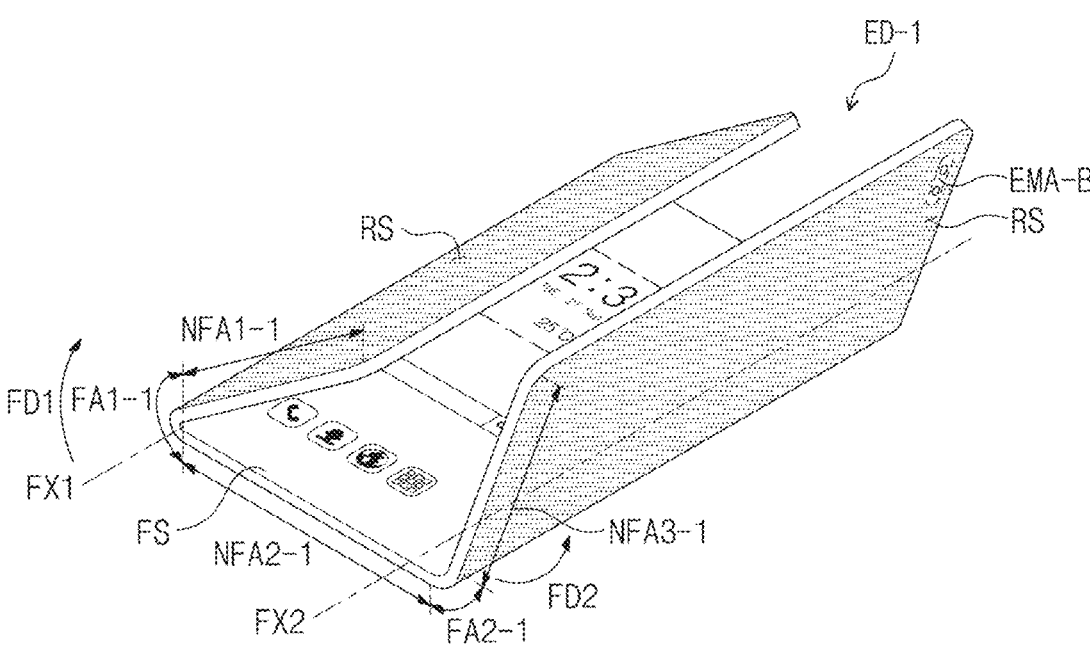
FIG. 3A is a perspective view illustrating an electronic device in a process of folding according to an embodiment.
Figure 3A:
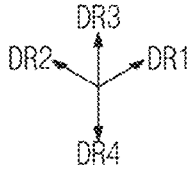
Figure 3B:
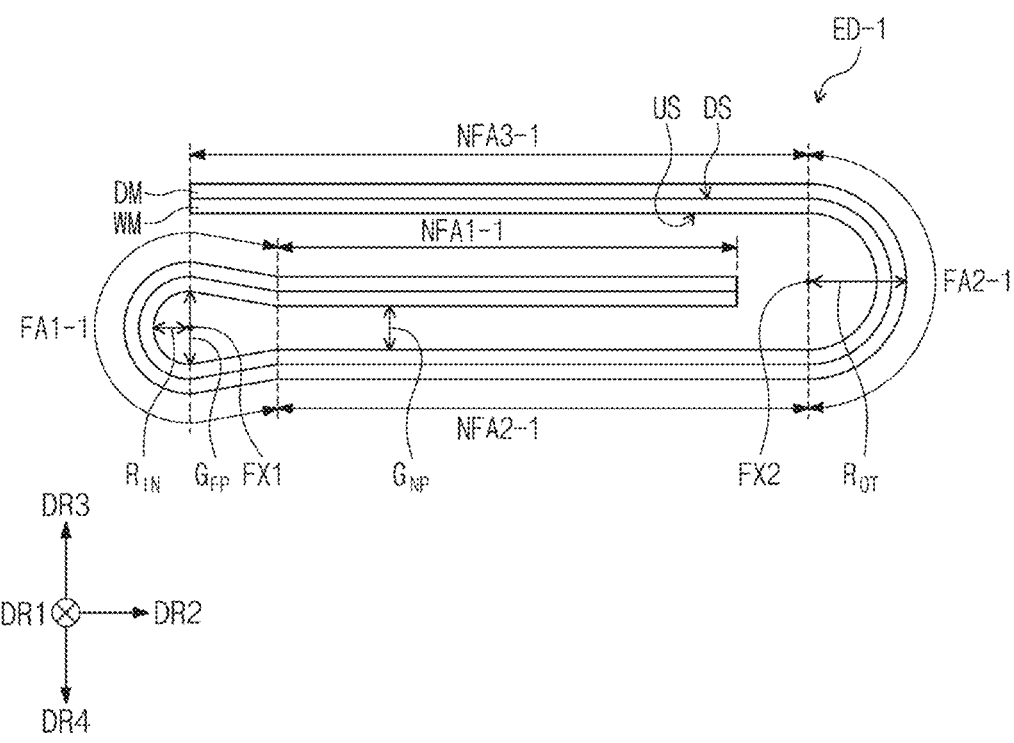
FIG. 3B is a cross-sectional view illustrating the electronic device in a folded state according to an embodiment.
Figure 3C:
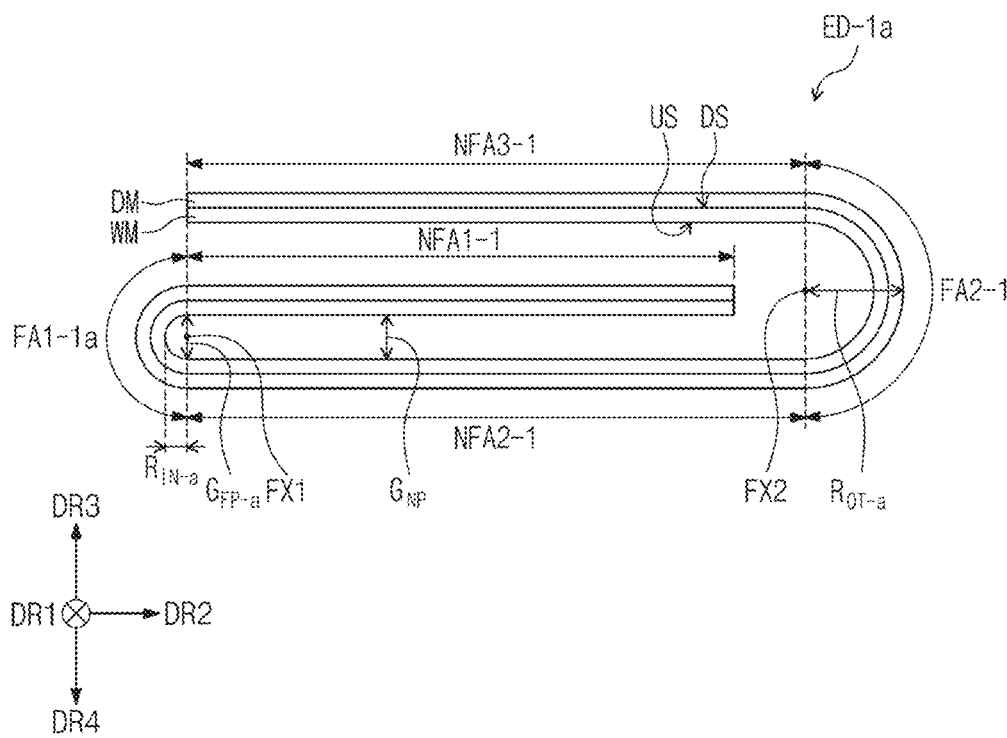
FIG. 3C is a cross-sectional view illustrating an electronic device in a folded state according to an embodiment.

FIG. 3A is a perspective view illustrating an electronic device ED-1 in a process of folding according to an embodiment. FIG. 3B is a side view illustrating the electronic device ED-1 in a folded state according to an embodiment. FIG. 3C is a side view illustrating an electronic device ED-1a in a folded state according to an embodiment. The embodiment of the electronic device ED-1 illustrated in FIG. 3A may be substantially the same as the embodiment of the electronic device ED illustrated in FIG. 2A except for a folding motion.

Referring to FIGS. 3A and 3B, an embodiment of the electronic device ED-1 may include a first folding area FA1-1 foldable about a first folding axis FX1 parallel to the first directional axis DR1 and a second folding area FA2-1 foldable about a second folding axis FX2 that is parallel to the first directional axis DR1 and spaced apart from the first folding axis FX1. In an embodiment, as illustrated in FIGS. 3A and 3B, the first folding axis FX1 and the second folding axis FX2 may be imaginary axes extending in the direction of the first directional axis DR1 and may be located over a display surface FS. The second folding axis FX2 may be spaced apart from the first folding axis FX1 in the direction of the second directional axis DR2. Alternatively, without being limited thereto, the first folding axis FX1 and the second folding axis FX2 may be parallel to any direction other than the first directional axis DR1.

In an embodiment of the electronic device ED-1, the first folding area FA1-1 may be folded in a first folding direction FD1, and the second folding area FA2-1 may be folded in a second folding direction FD2. In an embodiment, the first folding direction FD1 may be a direction in which the first folding area FA1-1 is folded in a way such that a display surface of a first non-folding area NFA1-1 and a display surface of a second non-folding area NFA2-1 are adjacent to each other and face each other, and the second folding direction FD2 may be a direction in which the second folding area FA2-1 is folded in a way such that a rear surface RS of a third non-folding area NFA3-1 is exposed to the outside.

The electronic device ED-1 may include a display module DM and a window WM. The window WM may be disposed on the display module DM. The window WM may include a lower surface DS adjacent to the display module DM and an upper surface US facing the lower surface DS in the thickness direction.

In an embodiment of the electronic device ED-1, the first folding area FA1-1 may be folded in an in-folding manner such that the display surface of the first non-folding area NFA1-1 and the display surface of the second non-folding area NFA2-1 are adjacent to each other and face each other. The second folding area FA2-1 may be folded in an in-folding manner such that the rear surface of the first non-folding area NFA1-1 and the display surface of the third non-folding area NFA3-1 are adjacent to each other and face each other. The rear surface RS of the third non-folding area NFA3-1 may be exposed to the outside in a folded state of the electronic device ED-1. When the electronic device ED-1 is folded as illustrated in FIG. 3A, the upper surface US of the window WM of the first non-folding area NFA1-1 and the upper surface US of the window WM of the second non-folding area NFA2-1 may be adjacent to each other and may face each other, and the upper surface US of the window WM of the third non-folding area NFA3-1 may face inward and may be adjacent to the lower surface DS of the window WM of the first non-folding area NFA1-1.

Referring to FIG. 3B, the first folding area FA1-1 may be folded to have a first radius of curvature $R_{IN}$. The first radius of curvature $R_{IN}$ may correspond to the maximum distance from the first folding axis FX1 to the upper surface of the window WM of the first folding area FA1-1. The second folding area FA2-1 may be folded to have a second radius of curvature $R_{OT}$. The second radius of curvature $R_{OT}$ may correspond to the maximum distance from the second folding axis FX2 to the upper surface of the window WM of the second folding area FA2-1. The second radius of curvature $R_{OT}$ of the second folding area FA2-1 folded in an in-folding manner may be greater than the first radius of curvature $R_{IN}$ of the first folding area FA1-1 folded in an in-folding manner.

In an embodiment illustrated in FIG. 3B, when the first folding area FA1-1 is folded, the first radius of curvature $R_{IN}$ may be about 2.5 mm, and the second radius of curvature $R_{OT}$ may be about 4.0 mm. Alternatively, without being limited thereto, the first radius of curvature $R_{IN}$ and the second radius of curvature $R_{OT}$ may be changed or modified based on the thickness of the electronic device.

Referring to FIG. 3B, in an embodiment of the electronic device ED-1, the gap $G_{FP}$ between the upper surfaces facing each other in the first folding area FA1-1 folded in an in-folding manner may be greater than the gap $G_{NP}$ between the first non-folding area NFA1-1 and the second non-folding area NFA2-1 facing each other in the folded state. The gap $G_{NP}$ between the upper surfaces of the window WM between the first non-folding area NFA1-1 and the second non-folding area NFA2-1 facing each other in the folded state may be smaller than twice the first radius of curvature $R_{IN}$.

The first folding area FA1-1 may have a water-drop shape when viewed on the plane defined by the second directional axis DR2 and the third directional axis DR3. The second folding area FA2-1 may have a U-shape when viewed on the plane defined by the second directional axis DR2 and the third directional axis DR3.

FIG. 3C is a side view illustrating the electronic device ED-1a in a folded state according to an embodiment. The embodiment of the electronic device ED-1a illustrated in FIG. 3C is substantially the same as the embodiment of the electronic device ED-1 illustrated in FIG. 3B except for a folded shape of a first folding area. In an embodiment of the electronic device ED-1a, the first folding area FA1-1a may be folded in an in-folding manner such that a display surface of a first non-folding area NFA1-1 and a display surface of a second non-folding area NFA2-1 are adjacent to each other and face each other. A second folding area FA2-1 may be folded in an in-folding manner such that a rear surface of the first non-folding area NFA1-1 and a display surface of a third non-folding area NFA3-1 are adjacent to each other and face each other.

In an embodiment of the electronic device ED-1a, the gap $G_{FP-a}$ between upper surfaces facing each other in the first folding area FA1-1a folded in an in-folding manner may be identical to or substantially the same as the gap $G_{NP}$ between the first non-folding area NFA1-1 and the second non-folding area NFA2-1 in the folded state. The first folding area FA1-1a may have a U-shape when viewed on the plane defined by the second directional axis DR2 and the third directional axis DR3. The gap $G_{NP}$ between the upper surfaces of the window WM between the first non-folding area NFA1-1 and the second non-folding area NFA2-1 facing each other in the folded state may correspond to or be about twice a first radius of curvature $R_{IN-a}$.

In an embodiment illustrated in FIG. 3C, when the first folding area FA1-1a is folded, the first radius of curvature $R_{IN-a}$ may be about 1.5 mm, and a second radius of curvature $R_{OT-a}$ may be about 4.0 mm. Alternatively, without being limited thereto, the first radius of curvature $R_{IN-a}$ and the second radius of curvature $R_{OT-a}$ may be changed or modified based on the thickness of the electronic device.

Figure 4:
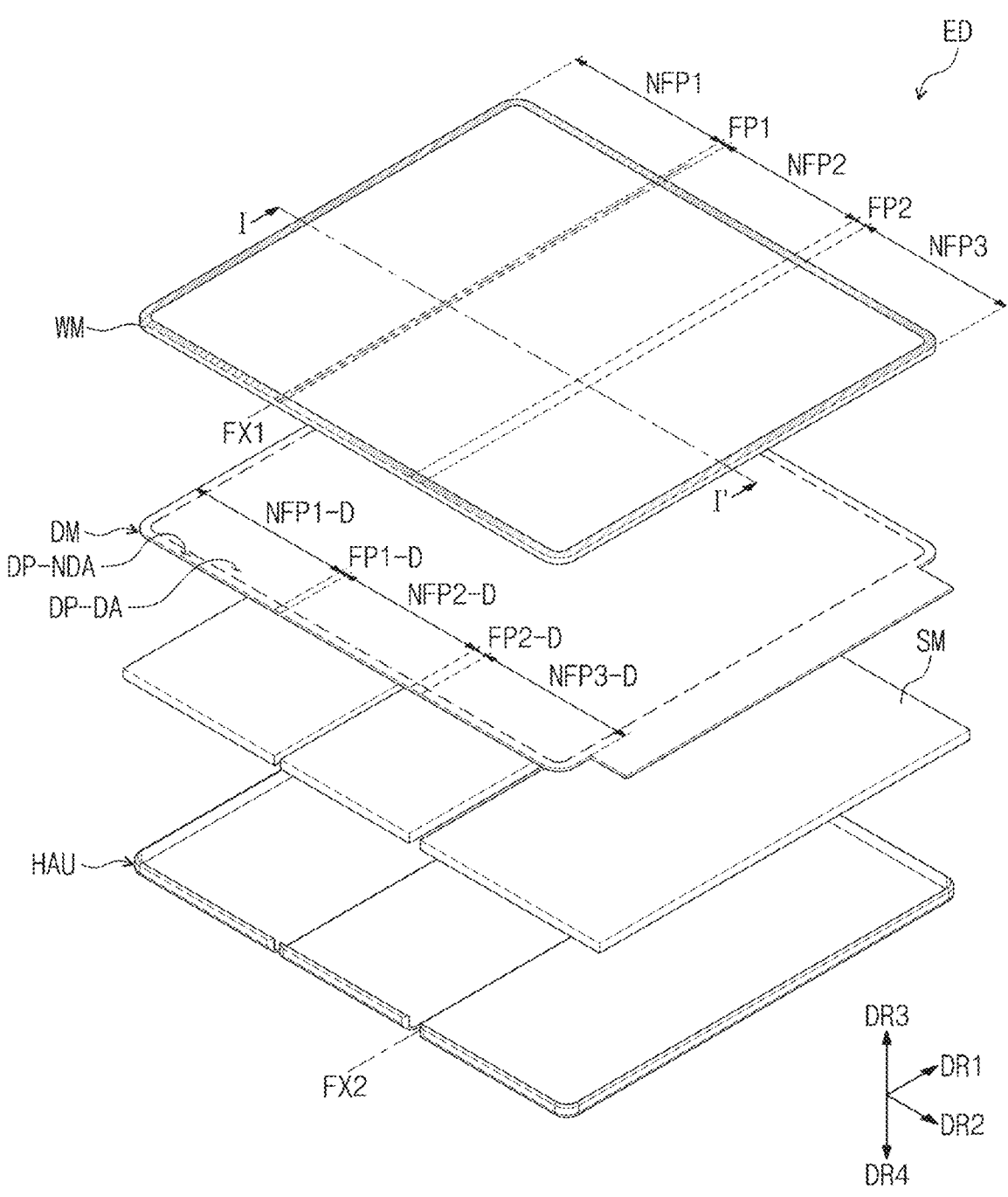
FIG. 4 is an exploded perspective view of an electronic device according to an embodiment.
Figure 5A:
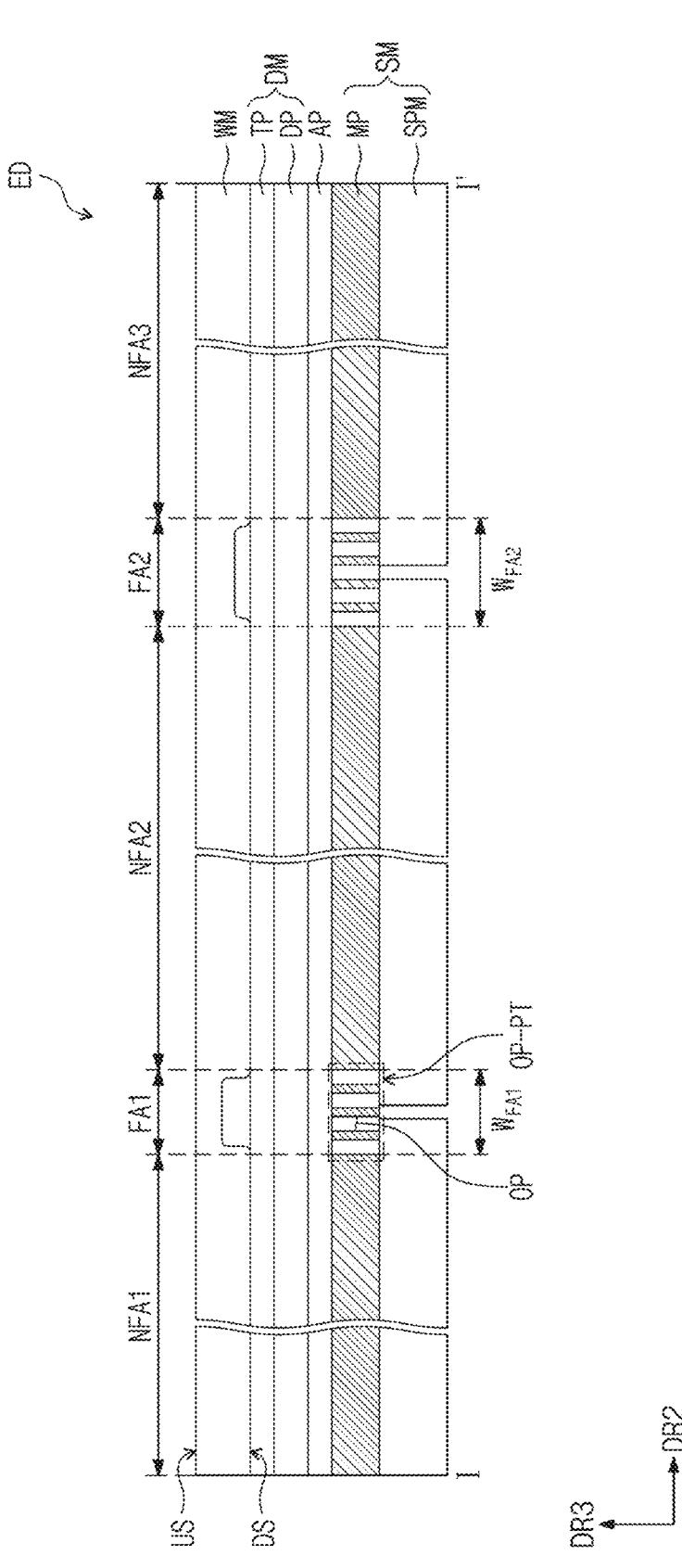
FIG. 5A is a cross-sectional view of the electronic device according to an embodiment.
Figure 5B:
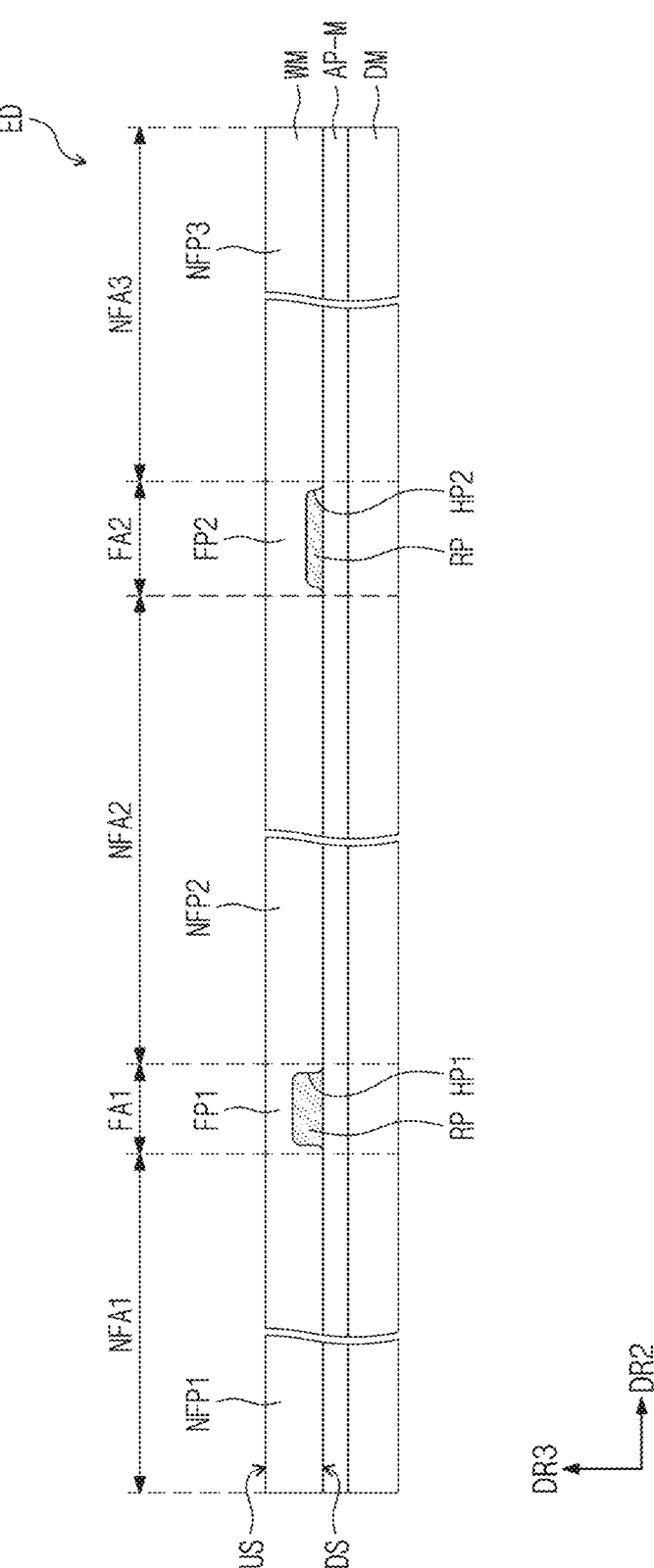
FIG. 5B is a cross-sectional view of the electronic device according to an embodiment.

FIG. 4 is an exploded perspective view of the electronic device ED according to an embodiment. FIG. 5A is a cross-sectional view of the electronic device ED according to an embodiment. FIG. 5B is a cross-sectional view of the electronic device ED according to an embodiment. FIG. 4 illustrates an exploded perspective view of the electronic device ED according to the embodiment illustrated in FIG. 1. FIG. 5A is a schematic cross-sectional view illustrating a portion corresponding to line I-I' of FIG. 4. FIG. 5B is a schematic cross-sectional view illustrating an embodiment of the portion corresponding to line I-I' of FIG. 4.

Referring to FIGS. 4 and 5A, an embodiment of the electronic device ED may include the display module DM and the window WM disposed on the display module DM. The electronic device ED may further include a lower module SM disposed under the display module DM. The electronic device ED may further include an adhesive layer AP-M (FIG. 5B) disposed between the display module DM and the window WM.

The window WM may cover the entire upper surface of the display module DM. The window WM may have a shape corresponding to the shape of the display module DM. The electronic device ED may include a housing HAU in which the display module DM and the lower module SM are accommodated. The housing HAU may be coupled with the window WM. Although not illustrated, the housing HAU may further include a hinge structure for facilitating folding or bending. The window WM may be a cover window disposed on the display module DM.

In an embodiment of the electronic device ED, the window WM may include an optically clear insulating material. The window WM may be a glass substrate or a polymer substrate. In an embodiment, the window WM may include or be formed of glass. In an embodiment, for example, the window WM may be a glass substrate, and at least a portion of which is chemically strengthened. In an embodiment, the window WM may include or be formed of glass and may be used as a cover window of the electronic device ED.

The window WM may include a first non-folding portion NFP1, a first folding portion FP1, a second non-folding portion NFP2, a second folding portion FP2, and a third non-folding portion NFP3 arranged in the direction of the second directional axis DR2. The radius of curvature when the first folding portion FP1 is folded may be smaller than the radius of curvature when the second folding portion FP2 is folded. The width $W_{FA1}$ of the first folding portion FP1 in the direction of the second directional axis DR2 may be smaller than the width $W_{FA2}$ of the second folding portion FP2 in the direction of the second directional axis DR2. The first folding portion FP1 and the second folding portion FP2 may have a width of "πR" or more in the direction of the second directional axis DR2. Here, "R" denotes the radius of curvature of the first or second folding portion. The window WM will be described below in greater detail. The width $W_{FA1}$ of the first folding portion FP1 may be greater than or equal to "π×(a first radius of curvature)", and the width $W_{FA2}$ of the second folding portion FP2 may be greater than or equal to "π×(a second radius of curvature)". The first radius of curvature and the second radius of curvature may be the radius of curvature of the first folding portion FP1 and the radius of curvature of the second folding portion FP2, respectively.

The display module DM may display an image based on an electrical signal and may transmit/receive information about an external input. The display module DM may include a display area DP-DA and a non-display area DP-NDA. The display area DP-DA may be defined as an area that outputs an image provided by the display module DM.

The non-display area DP-NDA is adjacent to the display area DP-DA. In an embodiment, for example, the non-display area DP-NDA may surround the display area DP-DA, but not being limited thereto. Alternatively, the non-display area DP-NDA may be defined in various shapes and is not limited to any one embodiment. According to an embodiment, the display area DP-DA of the display module DM may correspond to at least a portion of the active area F-AA (FIG. 1).

In an embodiment, the display module DM includes a display panel DP. The display panel DP may be an emissive display panel and is not particularly limited. In an embodiment, for example, the display panel DP may be an organic light emitting display panel or an inorganic light emitting display panel. An emissive layer of the organic light emitting display panel may include an organic light emitting material.

An emissive layer of the inorganic light emitting display panel may include quantum dots, quantum rods, and the like.

The display module DM may further include an input sensor TP. The input sensor TP may be directly disposed on the display panel DP. The input sensor TP may include a plurality of sensing electrodes. The input sensor TP may sense an external input using a self-cap method or a mutual-cap method. The input sensor TP may sense an input by an input device of an active type.

The input sensor TP may be formed directly on the display panel DP through a continuous process in manufacture of the display panel DP. Alternatively, without being limited thereto, the input sensor TP may be manufactured as a panel separate from the display panel DP and may be attached to the display panel DP by an adhesive layer (not illustrated).

The display module DM may include folding display portions FP1-D and FP2-D and non-folding display portions NFP1-D, NFP2-D, and NFP3-D. The folding display portions FP1-D and FP2-D may be portions corresponding to the folding areas FA1 and FA2 (FIG. 1), and the non-folding display portions NFP1-D, NFP2-D, and NFP3-D may be portions corresponding to the non-folding areas NFA1, NFA2, and NFA3 (FIG. 1).

The first folding display portion FP1-D may correspond to a portion foldable or bendable about the first folding axis FX1 extending in the direction of the first directional axis DR1. The second folding display portion FP2-D may correspond to a portion foldable or bendable about the second folding axis FX2 extending in the direction of the first directional axis DR1. The display module DM may include the first non-folding display portion NFP1-D and the second non-folding display portion NFP2-D spaced apart from each other with the first folding display portion FP1-D therebetween, and the second non-folding display portion NFP2-D and the third non-folding display portion NFP3-D spaced apart from each other with the second folding display portion FP2-D therebetween.

In an embodiment of the electronic device ED, the lower module SM may include a support plate MP and a lower support member SPM.

The support plate MP may be disposed under the display module DM. In an embodiment, the support plate MP may include a metallic material or a polymer material. In an embodiment, for example, the support plate MP may include or be formed of stainless steel, aluminum, or an alloy thereof. Alternatively, the support plate MP may include or be formed of a polymer material. In an embodiment, a plurality of openings OP may be defined in the support plate MP. The support plate MP may include an opening pattern OP-PT defined by the plurality of openings OP.

The lower support member SPM may be a portion overlapping most of the area of the display module DM. The lower support member SPM may include at least one selected from a support layer, a cushion layer, a shielding layer, and an interlayer bonding layer. Alternatively, without being limited to that disclosed, the configuration of the lower support member SPM may be variously modified based on the size and the shape of the electronic device ED or operating characteristics of the electrode device ED.

The electronic device ED may further include an adhesive layer AP disposed between the display module DM and the lower module SM. The adhesive layer AP may be an optically clear adhesive ("OCA") film or an optically clear adhesive resin ("OCR") layer.

FIG. 5B is a cross-sectional view illustrating the electronic device ED according to an embodiment. In FIG. 5B, the configuration of the display module DM is schematically illustrated, compared to that in FIG. 5A, and the configuration of the lower module SM is omitted. Referring to FIG. 5B, in an embodiment, a filling material RP may be disposed between the window WM and the display module DM included in the electronic device ED. The filling material RP may fill recesses HP1 and HP2 defined on the folding portions FP1 and FP2 of the window WM. The filling material RP may contain a material having a refractive index matching or substantially the same as the refractive index of the window WM. As the recesses HP1 and HP2 defined on the folding portions FP1 and FP2 of the window WM are filled with the filling material RP, degradation in quality caused by the recesses HP1 and HP2 may be improved, and the mechanical strength in the folding portions FP1 and FP2 may be improved.

Figure 6A:
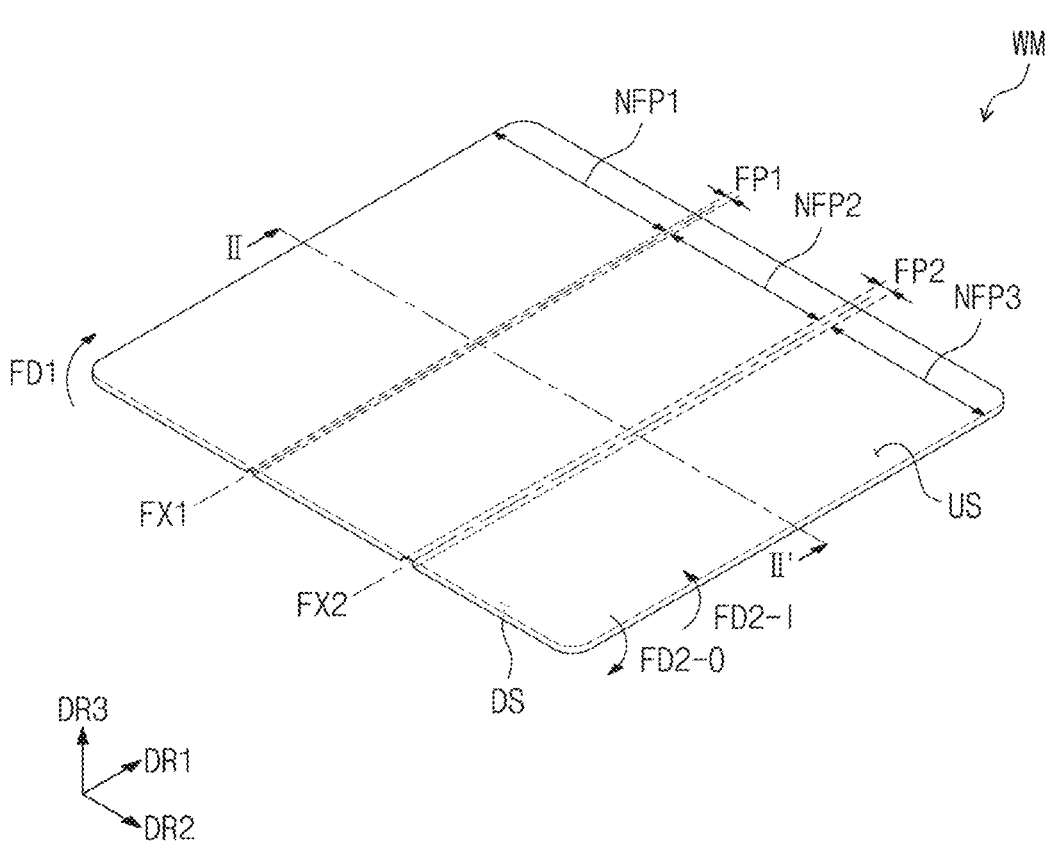
FIG. 6A is a perspective view of a window according to an embodiment.
Figure 6B:
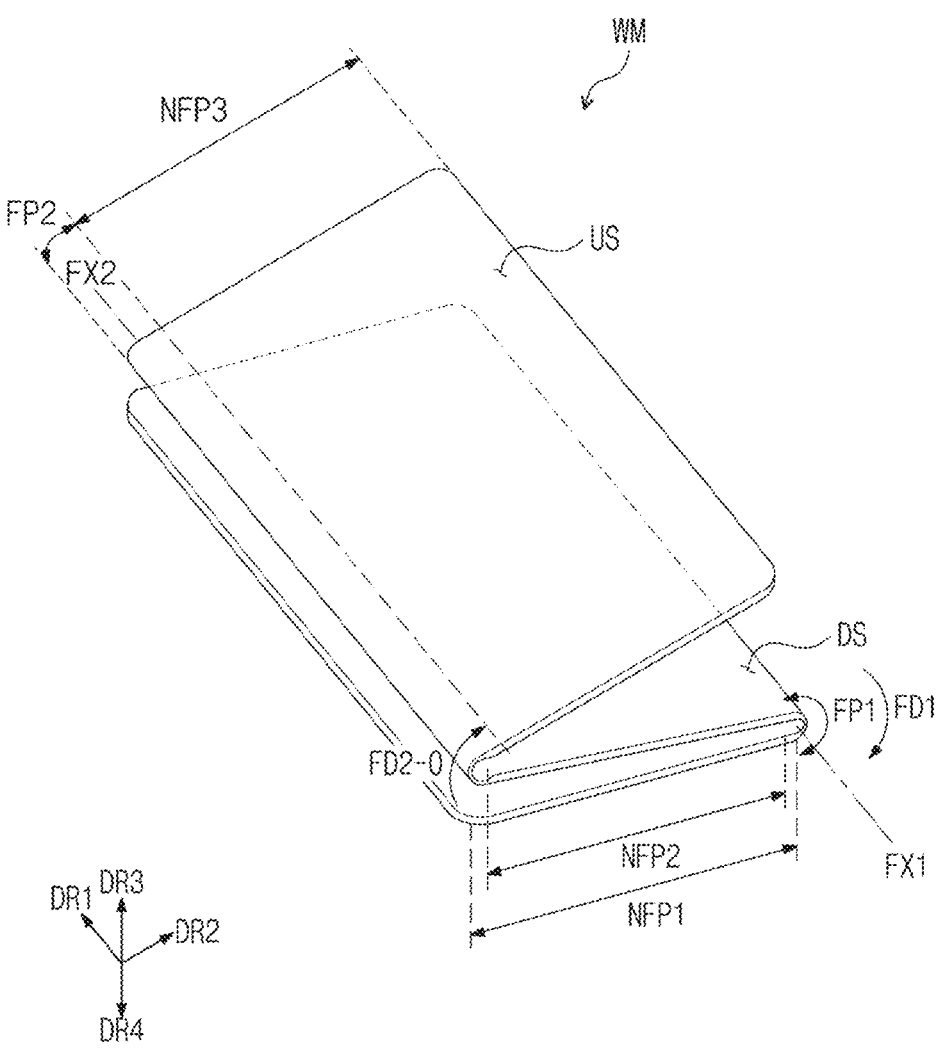
FIG. 6B is a perspective view illustrating the window in a process of folding according to an embodiment.
Figure 6C:
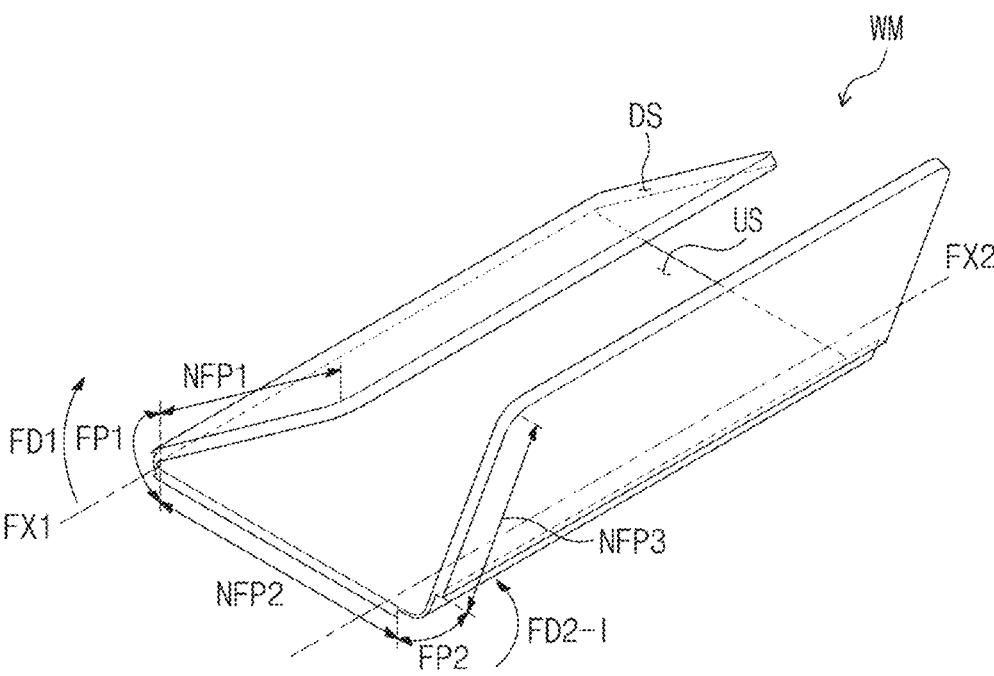
FIG. 6C is a perspective view illustrating the window in a process of folding according to an embodiment.
Figure 6C:
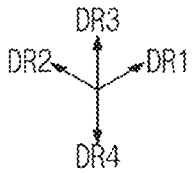
Figure 6D:
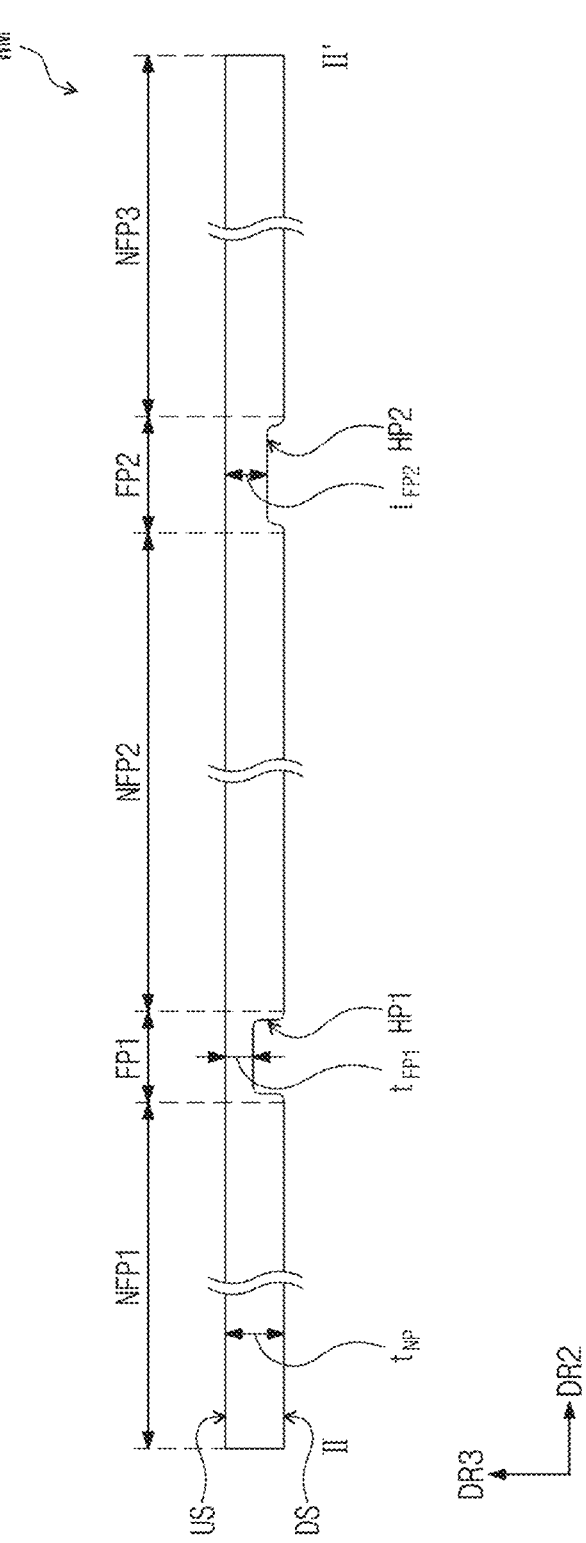
FIG. 6D is a cross-sectional view of the window according to an embodiment.

FIG. 6A is a perspective view illustrating the window WM according to an embodiment. FIG. 6B is a perspective view illustrating the window WM in a process of folding according to an embodiment. FIG. 6C is a perspective view illustrating the window WM in a process of folding according to an embodiment. FIG. 6D is a cross-sectional view of the window WM according to an embodiment. FIG. 6D is a cross-sectional view taken along line II-II' of FIG. 6A.

In an embodiment, the window WM may include the upper surface US and the lower surface DS facing each other in the direction of the third directional axis DR3 that is the thickness direction. In an embodiment of the window WM illustrated in FIGS. 6A to 6D, the lower surface DS may be a surface adjacent to the display module DM of the electronic device ED (FIG. 4).

The window WM may include the first non-folding portion NFP1, the first folding portion FP1, the second non-folding portion NFP2, the second folding portion FP2, and the third non-folding portion NFP3 sequentially disposed in the direction of the second directional axis DR2 that is one direction. The window WM may be used as the window of embodiments of the electronic device described above with reference to FIGS. 2A to 3C.

In an embodiment of the window WM, the first folding portion FP1 may be folded in the first folding direction FD1, and the second folding portion FP2 may be folded in the second folding direction FD2-O or FD2-I. In an embodiment, the first folding direction FD1 may be a direction in which the first folding portion FP1 is folded in a way such that the upper surface US of the first non-folding portion NFP1 and the upper surface US of the second non-folding portion NFP2 are adjacent to each other and face each other. The outer second folding direction FD2-O may be a direction in which the second folding portion FP2 is folded in a way such that the lower surface DS of the second non-folding portion NFP2 and the lower surface DS of the third non-folding portion NFP3 are adjacent to each other, and the inner second folding direction FD2-I may be a direction in which the second folding portion FP2 is folded in a way such that the lower surface DS of the first non-folding portion NFP1 and the upper surface US of the third non-folding portion NFP3 are adjacent to each other. That is, the first folding portion FP1 may be a portion folded in an in-folding manner such that the upper surface of the first non-folding portion NFP1 and the upper surface of the second non-folding portion NFP2 are adjacent to each other. The second folding portion FP2 may be a portion folded in an in-folding or out-folding manner.

FIG. 6B illustrates the window WM of FIG. 6A is in a process of folding in a way such that the first folding portion FP1 is folded about the first folding axis FX1 and the second folding portion FP2 is folded about the second folding axis FX2. Referring to FIG. 6B, the window WM may be folded in the first folding direction FD1 such that the upper surface US of the first non-folding portion NFP1 and the upper surface US of the second non-folding portion NFP2 are adjacent to each other and face each other and may be folded in the outer second folding direction FD2-O such that the lower surface DS of the second non-folding portion NFP2 and the lower surface DS of the third non-folding portion NFP3 are adjacent to each other.

FIG. 6C illustrates the window WM of FIG. 6A is in a process of folding in a way such that the first folding portion FP1 is folded about the first folding axis FX1 and the second folding portion FP2 is folded about the second folding axis FX2. Referring to FIG. 6C, the window WM may be folded in the first folding direction FD1 such that the upper surface US of the first non-folding portion NFP1 and the upper surface US of the second non-folding portion NFP2 are adjacent to each other and face each other and may be folded in the inner second folding direction FD2-I such that the lower surface DS of the first non-folding portion NFP1 and the upper surface US of the third non-folding portion NFP3 are adjacent to each other. The first folding portion FP1 may be folded to have a first radius of curvature, and the second folding portion FP2 may be folded to have a second radius of curvature greater than the first radius of curvature. The second folding portion FP2, which is folded to have a relatively large radius of curvature, may have a greater width in the direction of the second directional axis DR2 than the first folding portion FP1.

In an embodiment, the recesses HP1 and HP2 may be defined on the upper surface US or the lower surface DS of the window WM. The upper surface US or the lower surface DS of the window WM on which the recesses HP1 and HP2 are not defined may be a flat surface.

Referring to FIG. 6D, in an embodiment, the first recess HP1 may be defined on the lower surface of the first folding portion FP1, and the second recess HP2 may be defined on the lower surface of the second folding portion FP2. In such an embodiment, the recesses HP1 and HP2 are defined on the folding portions FP1 and FP2, such that folding characteristics of the window WM may be improved.

The recesses HP1 and HP2 may be defined on the upper surface US or the lower surface DS of the window WM through a slimming process. A physical polishing method or a chemical polishing method may be used in the slimming process.

In an embodiment of the window WM, the thickness $t_{FP1}$ of the first folding portion FP1 with the first recess HP1 defined thereon may be smaller than the thickness $t_{FP2}$ of the second folding portion FP2 with the second recess HP2 defined thereon. The second folding portion FP2, which is folded in an out-folding manner or is folded in an in-folding manner to have a greater radius of curvature than the first folding portion FP1, may be relatively thickened. Accordingly, the impact resistance of the second folding portion FP2 may be improved. That is, the window WM may include the folding portions FP1 and FP2 with the recesses HP1 and HP2 defined thereon, and the thickness $t_{FP2}$ of the second folding portion FP2, which is disposed in a relatively outer position and folded to have a large radius of curvature, may be greater than the thickness tipi of the first folding portion FP1. Accordingly, the window WM may have high folding characteristics and may exhibit improved impact resistance. In such an embodiment, the second folding portion FP2 may be slimmed such that the thickness of the second folding portion FP2 is similar to the thickness of the first folding portion FP1, and the recess HP2 may be formed accordingly.

In an embodiment illustrated in FIG. 6D, the thicknesses $t_{NP}$ of the first, second, and third non-folding portions NFP1, NFP2, and NFP3 may be greater than the thicknesses of the first and second folding portions FP1 and FP2. In an embodiment, the upper surfaces US and the lower surfaces DS of the first, second, and third non-folding portions NFP1, NFP2, and NFP3 may be flat surfaces.

The maximum thicknesses of the first folding portion FP1 and the second folding portion FP2 may satisfy Equation 1 below. In Equation 1 below, "t" denotes the maximum thickness of the first folding portion FP1 or the second folding portion FP2, and "R" denotes the radius of curvature of the first folding portion FP1 or the second folding portion FP2. That is, in an embodiment, each of the first folding portion FP1 and the second folding portions FP may have a thickness of 2R/100 or less.

$$t = \frac{2R}{100} \qquad \text{[Equation 1]}$$

In an embodiment, for example, where the radius of curvature of the first folding portion FP1 is about 1.5 mm, the maximum value of the thickness $t_{FP1}$ of the first folding portion FP1 may be about 30 micrometers (μm). In an embodiment, where the radius of curvature of the first folding portion FP1 is about 2.5 mm, the maximum value of the thickness $t_{FP1}$ of the first folding portion FP1 may be about 50 μm. In an embodiment, where the radius of curvature of the second folding portion FP2 is about 4.0 mm, the maximum value of the thickness $t_{FP2}$ of the second folding portion FP2 may be about 70 μm. In such an embodiment, a folding portion having a relatively large radius of curvature may be thickened to improve the impact resistance of the window while maintaining folding characteristics thereof. In such an embodiment, the minimum thicknesses in the folding portions may be changed or variously modified in the range in which impact resistance is maintained.

In an embodiment of the window WM included in the electronic device ED or ED-1 illustrated in FIG. 2B or 3B, the non-folding portions may have a thickness of about 100 μm or more, the first folding portion FP1 may have a thickness in a range of about 30 μm to about 60 μm, and the second folding portion FP2 may have a thickness in a range of about 60 μm to about 100 μm. In an embodiment, for example, in the window WM included in the electronic device ED or ED-1 illustrated in FIG. 2B or 3B, the non-folding portions may have a thickness of about 100 μm, the first folding portion FP1 may have a thickness of about 50 μm, and the second folding portion FP2 may have a thickness of about 70 μm. In an embodiment of the window WM included in the electronic device ED-a or ED-1a illustrated in FIG. 2C or 3C, the non-folding portions may have a thickness of about 100 μm, the first folding portion FP1 may have a thickness of about 30 μm, and the second folding portion FP2 may have a thickness of about 70 μm.

Figures 7A, 7B:
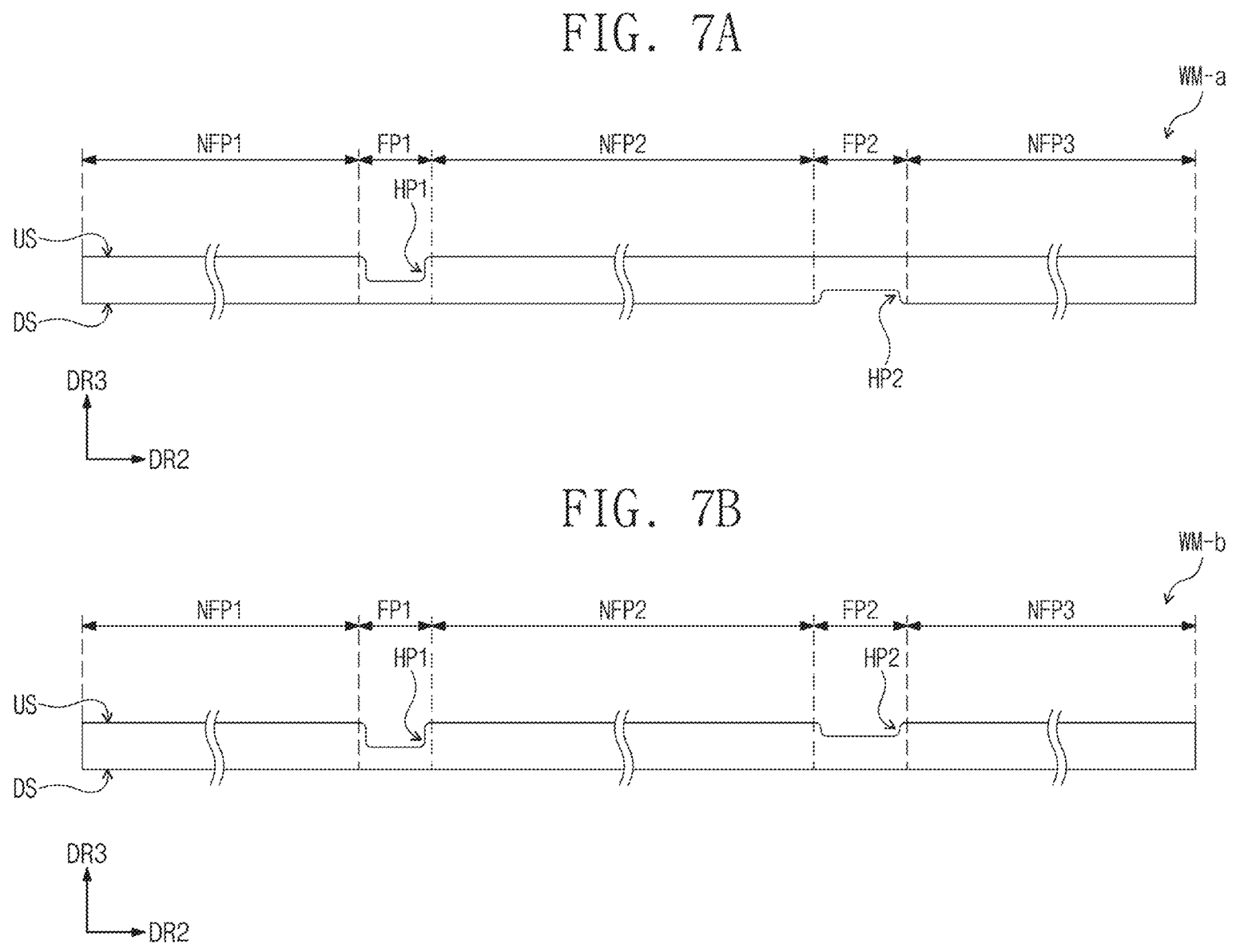
Figure 7C:
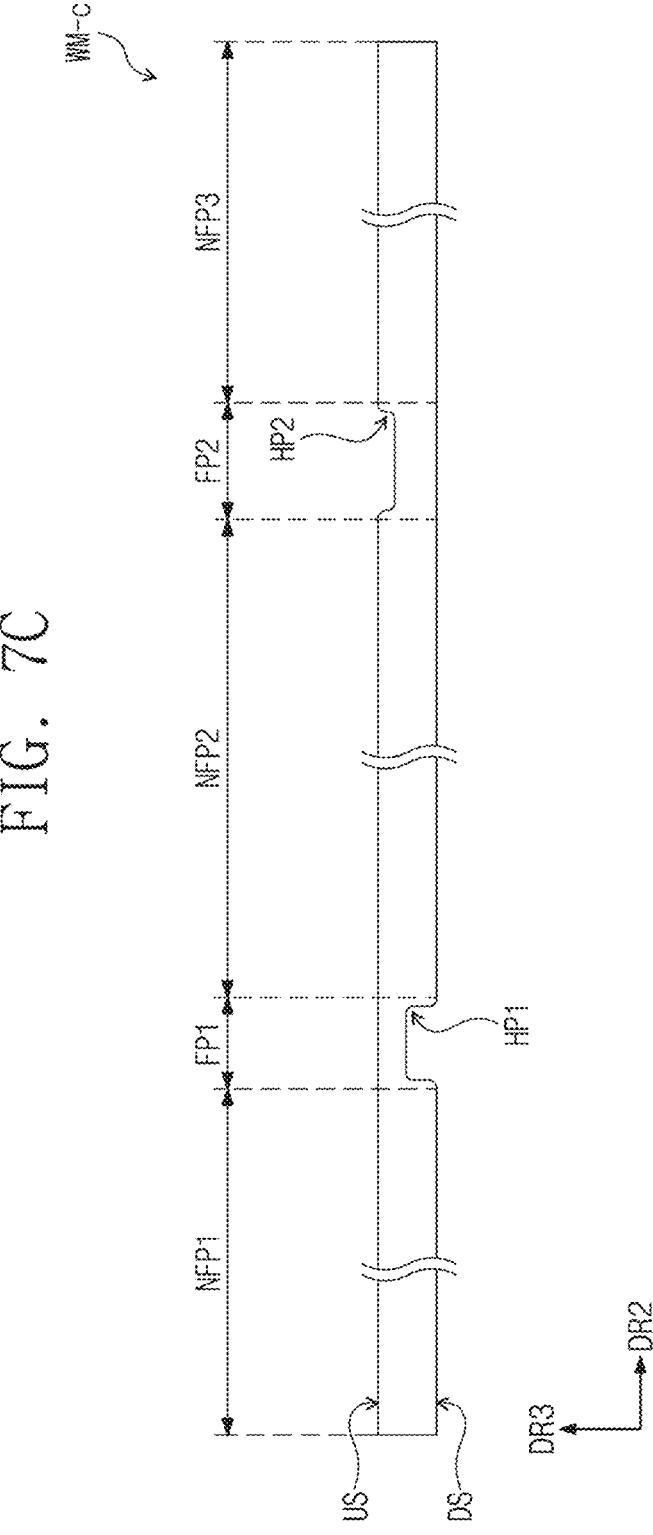
FIG. 7C is a cross-sectional view of a window according to an embodiment.

FIG. 7A is a cross-sectional view illustrating a window WM-a according to an embodiment. FIG. 7B is a cross-sectional view illustrating a window WM-b according to an embodiment. FIG. 7C is a cross-sectional view illustrating a window WM-c according to an embodiment. Embodiments of the window WM-a, WM-b, and WM-c illustrated in FIGS. 7A to 7C is substantially the same as the embodiments of the window WM described above with reference to FIGS. 6A to 6D except for the positions in which recesses HP1 and HP2 are defined. In embodiments illustrated in FIGS. 7A to 7C, the window WM-a, WM-b, or WM-c may include an upper surface US and a lower surface DS facing each other in the direction of the third directional axis DR3 that is the thickness direction. In the embodiments of the window illustrated in FIGS. 7A to 7C, the lower surface DS may be a surface adjacent to the display module DM (FIG. 4).

As described above with reference to FIGS. 6A to 6D, in embodiments of the windows WM-a, WM-b, and WM-c illustrated in FIGS. 7A to 7C, the width of first folding portion FP1 in the direction of the second directional axis DR2 may be smaller than the width of second folding portion FP2 in the direction of the second directional axis DR2. In such embodiments, the thickness of the second folding portion FP2 with the second recess HP2 defined thereon may be greater than the thickness of the first folding portion FP1 with the first recess HP1 defined thereon.

In an embodiment of the window WM-a illustrated in FIG. 7A, the first recess HP1 may be defined on the upper surface US of the window WM-a in the first folding portion FP1, and the second recess HP2 may be defined on the lower surface DS of the window WM-a in the second folding portion FP2. The lower surface DS of the first folding portion FP1 on which the first recess HP1 is not defined and the upper surface US of the second folding portion FP2 on which the second recess HP2 is not defined may be flat surfaces.

In an embodiment of the window WM-b illustrated in FIG. 7B, the first recess HP1 may be defined on the upper surface US of the window WM-b in the first folding portion FP1, and the second recess HP2 may be defined on the upper surface US of the window WM-b in the second folding portion FP2. The lower surface DS of the first folding portion FP1 on which the first recess HP1 is not defined and the lower surface DS of the second folding portion FP2 on which the second recess HP2 is not defined may be flat surfaces.

In an embodiment of the window WM-c illustrated in FIG. 7C, the first recess HP1 may be defined on the lower surface DS of the window WM-c in the first folding portion FP1, and the second recess HP2 may be defined on the upper surface US of the window WM-c in the second folding portion FP2. The upper surface US of the first folding portion FP1 on which the first recess HP1 is not defined and the lower surface DS of the second folding portion FP2 on which the second recess HP2 is not defined may be flat surfaces.

Although not illustrated, the recesses HP1 and HP2 in an embodiment of the window, as described with reference to FIGS. 6A to 7C, may be filled with a filling material. In such an embodiment where the recesses HP1 and HP2 are filled with the filling material, the upper or lower surfaces of the folding portions FP1 and FP2 with the recesses HP1 and HP2 defined thereon may have the same flat surfaces as the upper or lower surfaces of adjacent non-folding portions NFP1, NFP2, and NFP3. The filling material that fills the recesses HP1 and HP2 may include a material having a refractive index that matches or is substantially the same as the refractive indexes of the windows.

Hereinafter, embodiments of the window WM-1 and WM-2 will be described with reference to FIGS. 8A to 9B. Hereinafter, for convenience of description, any repetitive detailed descriptions of the same or like elements of the embodiments illustrated in FIGS. 8A to 9B as those described above with reference to FIGS. 1 to 7C will be omitted or simplified, and the following descriptions will be focused on the differences. Furthermore, the windows WM-1 and WM-2 to be described below with reference to FIGS. 8A to 9B may be included in embodiments of the electronic device described above.

Figure 8A:
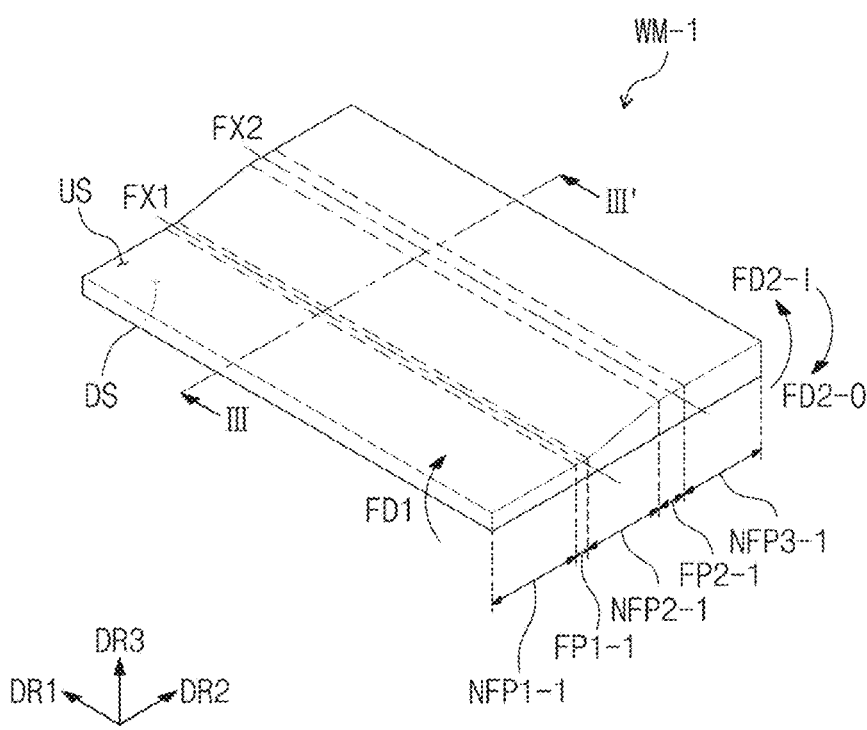
FIG. 8A is a perspective view of a window according to an embodiment.
Figure 8B:
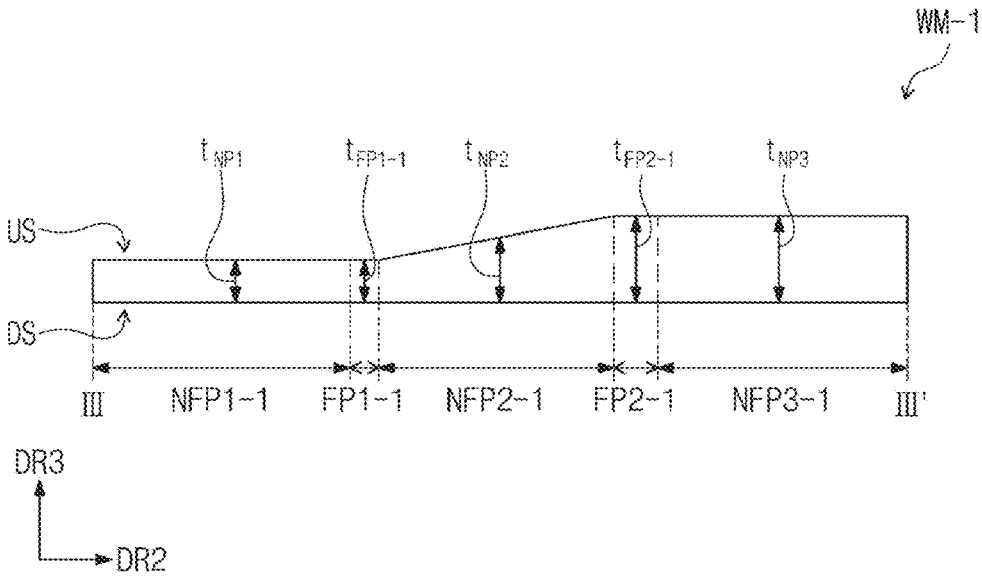
FIG. 8B is a cross-sectional view of the window according to an embodiment.

FIG. 8A is a perspective view illustrating the window WM-1 according to an embodiment, and FIG. 8B is a cross-sectional view illustrating the window WM-1 according to an embodiment. FIG. 8B is a cross-sectional view taken along line of FIG. 8A.

Referring to FIGS. 8A and 8B, an embodiment of the window WM-1 may include slimmed non-folding portions NFP1-1 and NFP2-1. In such an embodiment, the window WM-1 may include the first non-folding portion NFP1-1, a first folding portion FP1-1, the second non-folding portion NFP2-1, a second folding portion FP2-1, and a third non-folding portion NFP3-1 sequentially arranged in the direction of the second directional axis DR2.

In an embodiment of the window WM-1, the first folding portion FP1-1 may be folded in a first folding direction FD1, and the second folding portion FP2-1 may be folded in a second folding direction FD2-O or FD2-I. In an embodiment, the first folding direction FD1 may be a direction in which the first folding portion FP1-1 is folded in a way such that an upper surface US of the first non-folding portion NFP1-1 and an upper surface US of the second non-folding portion NFP2-1 are adjacent to each other and face each other. The outer second folding direction FD2-O may be a direction in which the second folding portion FP2-1 is folded in a way such that a lower surface DS of the second non-folding portion NFP2-1 and a lower surface DS of the third non-folding portion NFP3-1 are adjacent to each other, and the inner second folding direction FD2-I may be a direction in which the second folding portion FP2-1 is folded in a way such that a lower surface DS of the first non-folding portion NFP1-1 and an upper surface US of the third non-folding portion NFP3-1 are adjacent to each other. That is, the first folding portion FP1-1 may be a portion folded in an in-folding manner, and the second folding portion FP2-1 may be a portion folded in an in-folding or out-folding manner.

In an embodiment of the window WM-1, the thickness $t_{NP2}$ of the second non-folding portion NFP2-1 may be gradually increased from the first non-folding portion NFP1-1 toward the third non-folding portion NFP3-1. The upper surface US of the second non-folding portion NFP2-1 may be an inclined surface. The first non-folding portion NFP1-1 may have a first thickness $t_{NP1}$, and the third non-folding portion NFP3-1 may have a third thickness $t_{NP3}$ greater than the first thickness $t_{NP1}$. The thickness $t_{FP2-1}$ of the second folding portion FP2-1 may be greater than the thickness $t_{FP1-1}$ of the first folding portion FP1-1. In an embodiment, the thickness $t_{FP1-1}$ of the first folding portion FP1-1 may be equal to the first thickness $t_{NP1}$ of the first non-folding portion NFP1-1, and the thickness $t_{FP2-1}$ of the second folding portion FP2-1 may be equal to the third thickness $t_{NP3}$ of the third non-folding portion NFP3-1. However, embodiments of the disclosure are not limited thereto.

In an embodiment, for example, the first thickness $t_{NP1}$ of the first non-folding portion NFP1-1 may be about 50 µm, and the third thickness $t_{NP3}$ of the third non-folding portion NFP3-1 may be about 70 µm. The thickness $t_{NP2}$ of the second non-folding portion NFP2-1 may be gradually increased from a portion adjacent to the first non-folding portion NFP1-1 toward a portion adjacent to the third non-folding portion NFP3-1. The thickness $t_{NP2}$ of the second non-folding portion NFP2-1 adjacent to the first non-folding portion NFP1-1 may be about 50 µm, and the thickness $t_{NP2}$ of the second non-folding portion NFP2-1 adjacent to the third non-folding portion NFP3-1 may be about 70 µm. However, embodiments of the disclosure are not limited thereto.

The first thickness $t_{NP1}$ of the first non-folding portion NFP1-1 may be smaller than the third thickness $t_{NP3}$ of the third non-folding portion NFP3-1, and the second non-folding portion NFP2-1 may be slimmed such that the thickness thereof is gradually varied. Accordingly, folding characteristics of the window WM-1 may be improved. In an embodiment, the third thickness $t_{NP3}$ of the third non-folding portion NFP3-1, which is exposed to the outside during folding or disposed in a relatively outer position, may be made greater than the thicknesses of the first non-folding portion NFP1-1 and the second non-folding portions NFP2-1. Accordingly, the impact resistance of the window WM-1 may be improved. In an embodiment of the window WM-1, the first non-folding portion NFP1-1 and the second non-folding portion NFP2-1 may be formed by slimming the entire surfaces, and the boundary of an etched area that is likely to be generated in the slimming process may not be visible.

Figure 9A:
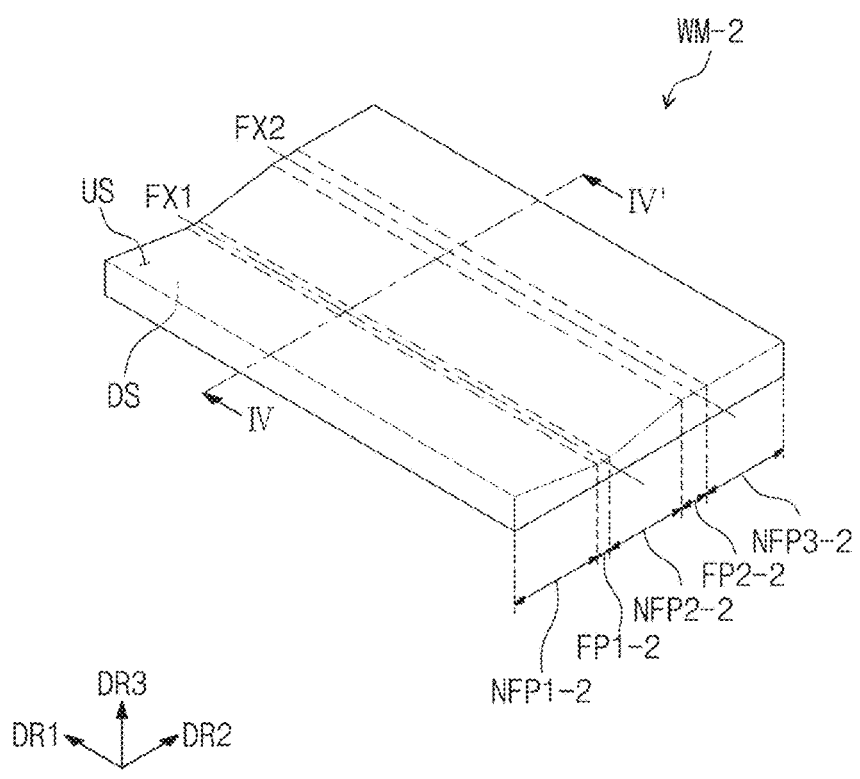
FIG. 9A is a perspective view of a window according to an embodiment.
Figure 9B:
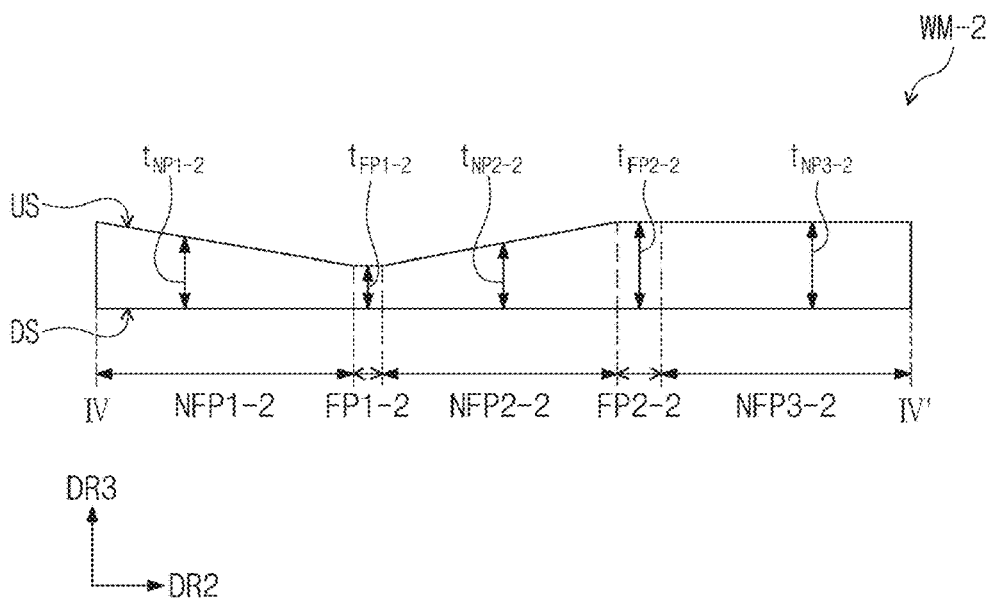
FIG. 9B is a cross-sectional view of the window according to an embodiment.

FIG. 9A is a perspective view illustrating the window WM-2 according to an embodiment, and FIG. 9B is a cross-sectional view of the window WM-2 according to an embodiment. FIG. 9B is a cross-sectional view taken along line IV-IV' of FIG. 9A.

Referring to FIGS. 9A and 9B, an embodiment of the window WM-2 may include slimmed non-folding portions NFP1-2 and NFP2-2. The window WM-2 may include the first non-folding portion NFP1-2, a first folding portion FP1-2, the second non-folding portion NFP2-2, a second folding portion FP2-2, and a third non-folding portion NFP3-2 sequentially arranged in the direction of the second directional axis DR2.

In an embodiment of the window WM-2, the first folding portion FP1-2 may be folded in a first folding direction FD1, and the second folding portion FP2-2 may be folded in a second folding direction FD2-O or FD2-I. In an embodiment, the first folding direction FD1 may be a direction in which the first folding portion FP1-2 is folded in a way such that an upper surface US of the first non-folding portion NFP1-2 and an upper surface US of the second non-folding portion NFP2-2 are adjacent to each other and face each other. The outer second folding direction FD2-O may be a direction in which the second folding portion FP2-2 is folded in a way such that a lower surface DS of the second non-folding portion NFP2-2 and a lower surface DS of the third non-folding portion NFP3-2 are adjacent to each other, and the inner second folding direction FD2-I may be a direction in which the second folding portion FP2-2 is folded in a way such that a lower surface DS of the first non-folding portion NFP1-2 and an upper surface US of the third non-folding portion NFP3-2 are adjacent to each other. That is, the first folding portion FP1-2 may be a portion folded in an in-folding manner, and the second folding portion FP2-2 may be a portion folded in an in-folding or out-folding manner.

In an embodiment of the window WM-2, the thickness $t_{NP2-2}$ of the second non-folding portion NFP2-2 may be gradually increased from the first non-folding portion NFP1-2 toward the third non-folding portion NFP3-2. In such an embodiment, the first thickness $t_{NP1-2}$ of the first non-folding portion NFP1-2 may be gradually increased as being farther away from, or in a direction away from, the second non-folding direction NFP2-2. An upper surface US of the second non-folding portion NFP2-2 and an upper surface US of the first non-folding portion NFP1-2 may be inclined surfaces.

The thickness $t_{FP2-2}$ of the second folding portion FP2-2 may be greater than the thickness $t_{FP1-2}$ of the first folding portion FP1-2. In an embodiment, the thickness $t_{FP1-2}$ of the first folding portion FP1-2 may be equal to the thickness of one side of the first non-folding portion NFP1-2 adjacent to the first folding portion FP1-2, and the thickness $t_{FP2-2}$ of the second folding portion FP2-2 may be equal to the thickness of one side of the third non-folding portion NFP3-2 adjacent to the second folding portion FP2-2. However, embodiments of the disclosure are not limited thereto.

The first non-folding portion NFP1-2 and the second non-folding portion NFP2-2 may have shapes symmetrical to each other with respect to the first folding portion FP1-2. When the first folding portion FP1-2 is folded, the upper surface US of the first non-folding portion NFP1-2 and the upper surface US of the second non-folding portion NFP2-2 may have shapes corresponding to each other.

In an embodiment, for example, the third thickness $t_{NP3-2}$ of the third non-folding portion NFP3-2 may be about 70 μm. The first thickness $t_{NP1-2}$ at one end of the first non-folding portion NFP1-2 spaced apart from the second non-folding portion NFP2-2 may be about 70 μm. The first thickness $t_{NP1-2}$ of the first non-folding portion NFP1-2 may be gradually decreased in a direction toward the second non-folding portion NFP2-2, and the first thickness $t_{NP1-2}$ of the first non-folding portion NFP1-2 in a position adjacent to the first folding portion FP1-2 may be about 50 μm. The thickness $t_{NP2-2}$ of the second non-folding portion NFP2-2 may be gradually increased from a portion adjacent to the first non-folding portion NFP1-2 toward a portion adjacent to the third non-folding portion NFP3-2. The thickness $t_{NP2-2}$ of the second non-folding portion NFP2-2 adjacent to the first non-folding portion NFP1-2 may be about 50 μm, and the thickness $t_{NP2-2}$ of the second non-folding portion NFP2-2 adjacent to the third non-folding portion NFP3-2 may be about 70 μm. However, embodiments of the disclosure are not limited thereto.

The first non-folding portion NFP1-2 and the second non-folding portion NFP2-2 may be slimmed such that the thicknesses thereof are gradually varied. Accordingly, folding characteristics of the window WM-2 may be improved. Furthermore, the third non-folding portion NFP3-2, which is exposed to the outside during folding or disposed in a relatively outer position, may have flat surfaces to have the third thickness $t_{NP3-2}$. Accordingly, the impact resistance of the window WM-2 may be improved. In addition, in the window WM-2, the first non-folding portion NFP1-2 and the second non-folding portion NFP2-2 may be formed by slimming the entire surfaces, and the boundary of an etched area that is likely to be generated in the slimming process may not be visible.

In an embodiment, among a plurality of folding portions of a window, a folding portion that is folded to have a relatively large radius of curvature may have a relatively large thickness, and thus the window may simultaneously exhibit high folding characteristics and high impact resistance. In an embodiment, an electronic device may include a window that is disposed on a display module and in which a folding portion folded to have a relatively large radius of curvature may have a relatively large thickness. Accordingly, the electronic device may exhibit high folding characteristics and high impact resistance.

As described above, embodiments of the windows may include the plurality of folding portions having different thicknesses from each other and different radii of curvature from each other and thus may exhibit high folding characteristics and improved impact resistance.

Embodiments of the electronic devices may each include the window disposed on the display module and including the plurality of folding portions having different thicknesses from each other and folded to have different radii of curvature from each other and thus may exhibit high folding characteristics and high impact resistance.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A window, which is a cover window for an electronic device and has an upper surface and a lower surface opposite to each other in a thickness direction, wherein the window is a glass substrate, at least a portion of which is chemically strengthened, the glass substrate comprising:

a non-folding portion including a first non-folding portion, a second non-folding portion, and a third non-folding portion spaced apart from one another;

a first folding portion disposed between the first non-folding portion and the second non-folding portion and foldable to have a first radius of curvature; and a second folding portion disposed between the second non-folding portion and the third non-folding portion and foldable to have a second radius of curvature greater than the first radius of curvature, wherein the first folding portion of a glass portion of the glass substrate, which is formed of glass, is thinner than the second folding portion of the glass portion of the glass substrate, wherein a first recess is defined on the first folding portion by a surface of the glass portion of the glass substrate, and a second recess is defined on the second folding portion by a surface of the glass portion of the glass substrate, and wherein the first non-folding portion, the second non-folding portion, and the third non-folding portion have substantially a same thickness.

2. The window of claim 1, wherein the first folding portion is foldable in a way such that the upper surface of the first non-folding portion and the upper surface of the second non-folding portion are adjacent to each other and face each other, and wherein the second folding portion is foldable in a way such that the upper surface of the third non-folding portion is exposed to the outside.

3. The window of claim 1, wherein the first folding portion is foldable in a way such that the upper surface of the first non-folding portion and the upper surface of the second non-folding portion are adjacent to each other and face each other, and wherein the second folding portion is foldable in a way such that the lower surface of the third non-folding portion is exposed to the outside.

4. The window of claim 3, wherein a first recess is defined on the first folding portion has, and a second recess is defined on the second folding portion.

5. The window of claim 1, wherein the first recess and the second recess are defined on the upper surface, or the first recess and the second recess are defined on the lower surface.

6. The window of claim 1, wherein one of the first recess and the second recess is defined on the upper surface, and the other of the first recess and the second recess is defined on the lower surface.

7. The window of claim 1, wherein each of the first folding portion and the second folding portion has a thickness of 2R/100 or less, and wherein R denotes the first radius of curvature or the second radius of curvature.

8. A window, which is a cover window for an electronic device and has an upper surface and a lower surface opposite to each other in a thickness direction, the window comprising:

a non-folding portion including a first non-folding portion, a second non-folding portion, and a third non-folding portion spaced apart from one another;

a first folding portion disposed between the first non-folding portion and the second non-folding portion and foldable to have a first radius of curvature; and a second folding portion disposed between the second non-folding portion and the third non-folding portion and foldable to have a second radius of curvature greater than the first radius of curvature, wherein the first folding portion is thinner than the second folding portion, wherein the second non-folding portion has a thickness continuously increasing in a direction from the first non-folding portion toward the third non-folding portion, and wherein the thickness of one end of the second non-folding portion at a boundary thereof with the second folding portion is greater than the thickness of the other end of the second non-folding portion at a boundary thereof with the first folding portion.

9. The window of claim 8, wherein the first non-folding portion has a first thickness, and the third non-folding portion has a third thickness greater than the first thickness.

10. The window of claim 8, wherein the first non-folding portion has a thickness increasing as a distance from the first folding portion increases.

11. The window of claim 10, wherein the first non-folding portion and the second non-folding portion have symmetrical shapes with respect to the first folding portion.

12. The window of claim 1, wherein the non-folding portion has a thickness of about 100 μm or greater, wherein the first folding portion has a thickness in a range of about 30 μm to about 60 μm, and wherein the second folding portion has a thickness in a range of about 60 μm to about 100 μm.

* * * * *